United States Patent
Calvert

(10) Patent No.: US 10,773,376 B2
(45) Date of Patent: Sep. 15, 2020

(54) POLE ASSEMBLY

(71) Applicant: Chris Calvert, Gilbert, AZ (US)

(72) Inventor: Chris Calvert, Gilbert, AZ (US)

( * ) Notice: Subject to any disclaimer, the term of this patent is extended or adjusted under 35 U.S.C. 154(b) by 297 days.

(21) Appl. No.: 16/105,782

(22) Filed: Aug. 20, 2018

(65) Prior Publication Data

US 2020/0055180 A1 Feb. 20, 2020

(51) Int. Cl.
*B25J 1/04* (2006.01)
*H02G 1/04* (2006.01)

(52) U.S. Cl.
CPC . *B25J 1/04* (2013.01); *H02G 1/04* (2013.01)

(58) Field of Classification Search
CPC ... B25J 1/04; A47F 13/06; H01K 3/32; B25B 13/48; B25B 13/50
See application file for complete search history.

(56) References Cited

U.S. PATENT DOCUMENTS

| | | | | |
|---|---|---|---|---|
| 5,507,209 A | * | 4/1996 | Allen | B25B 13/48 81/124.2 |
| 5,809,851 A | * | 9/1998 | Thompson | B25B 13/48 81/124.2 |
| 6,786,116 B2 | * | 9/2004 | Dockery | B25B 13/06 279/46.3 |
| 7,127,972 B2 | * | 10/2006 | Klein | B23B 51/126 81/177.2 |
| 8,671,805 B2 | * | 3/2014 | Henderson | B25B 13/481 81/124.2 |
| 9,321,158 B2 | * | 4/2016 | Calvert | B25B 9/00 |
| 9,676,070 B2 | * | 6/2017 | Dockery | B21F 15/04 |

* cited by examiner

*Primary Examiner* — David B. Thomas

(57) ABSTRACT

The invention involves a tool, which includes a tool body with first and second flanged portion spaced apart by a first upper cable opening, and a ring positioned proximate thereto. The ring includes a ring opening positioned proximate to the first upper cable opening. The tool body includes a lower cable opening positioned away from the ring.

20 Claims, 26 Drawing Sheets

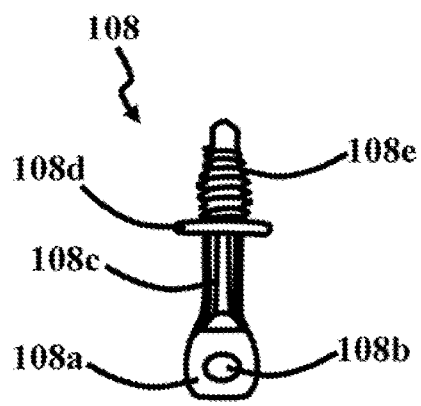
FIG. 2a
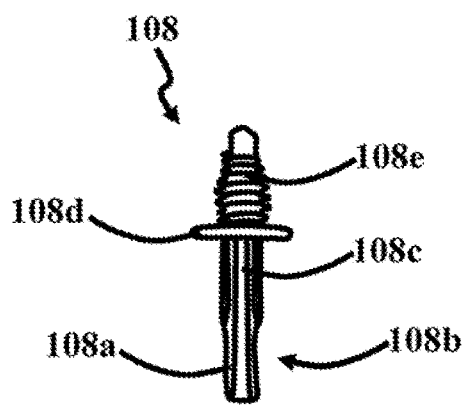
FIG. 2b
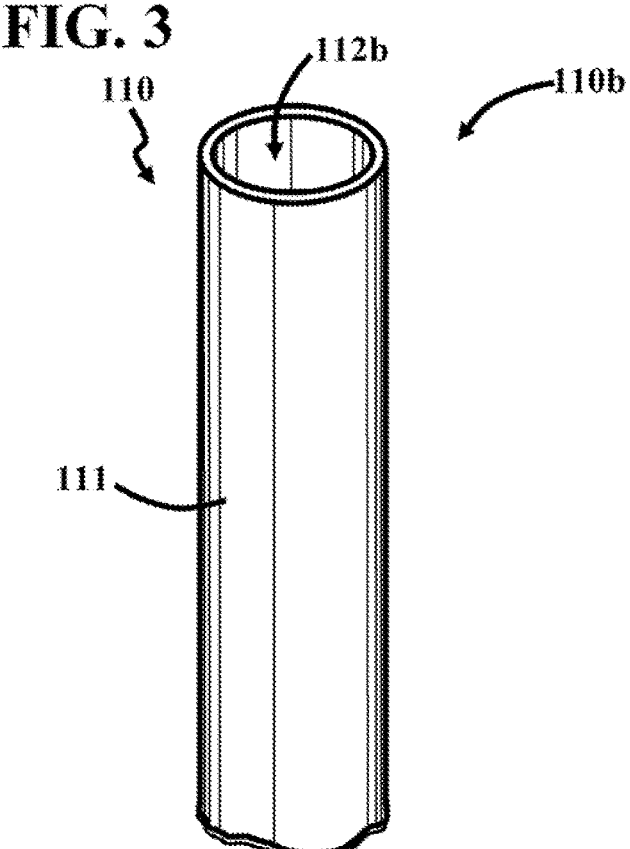
FIG. 3
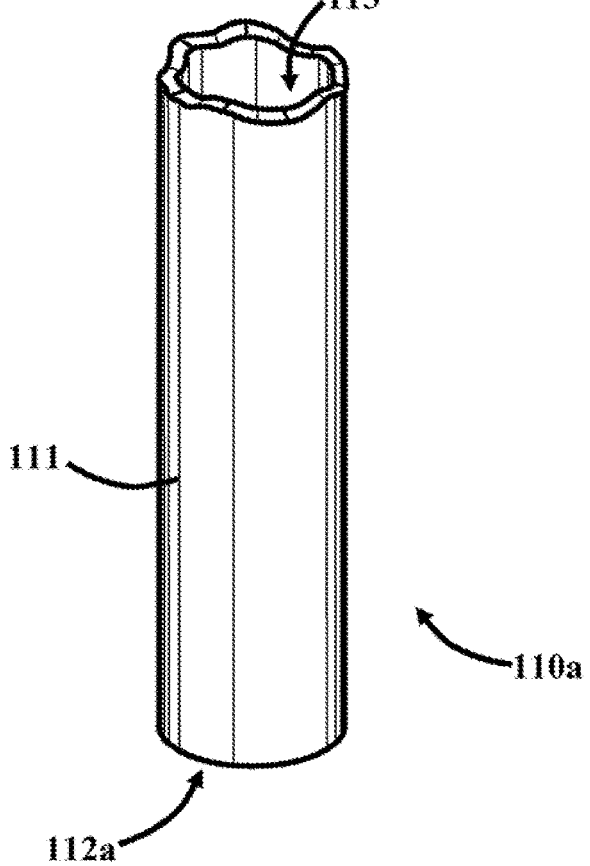

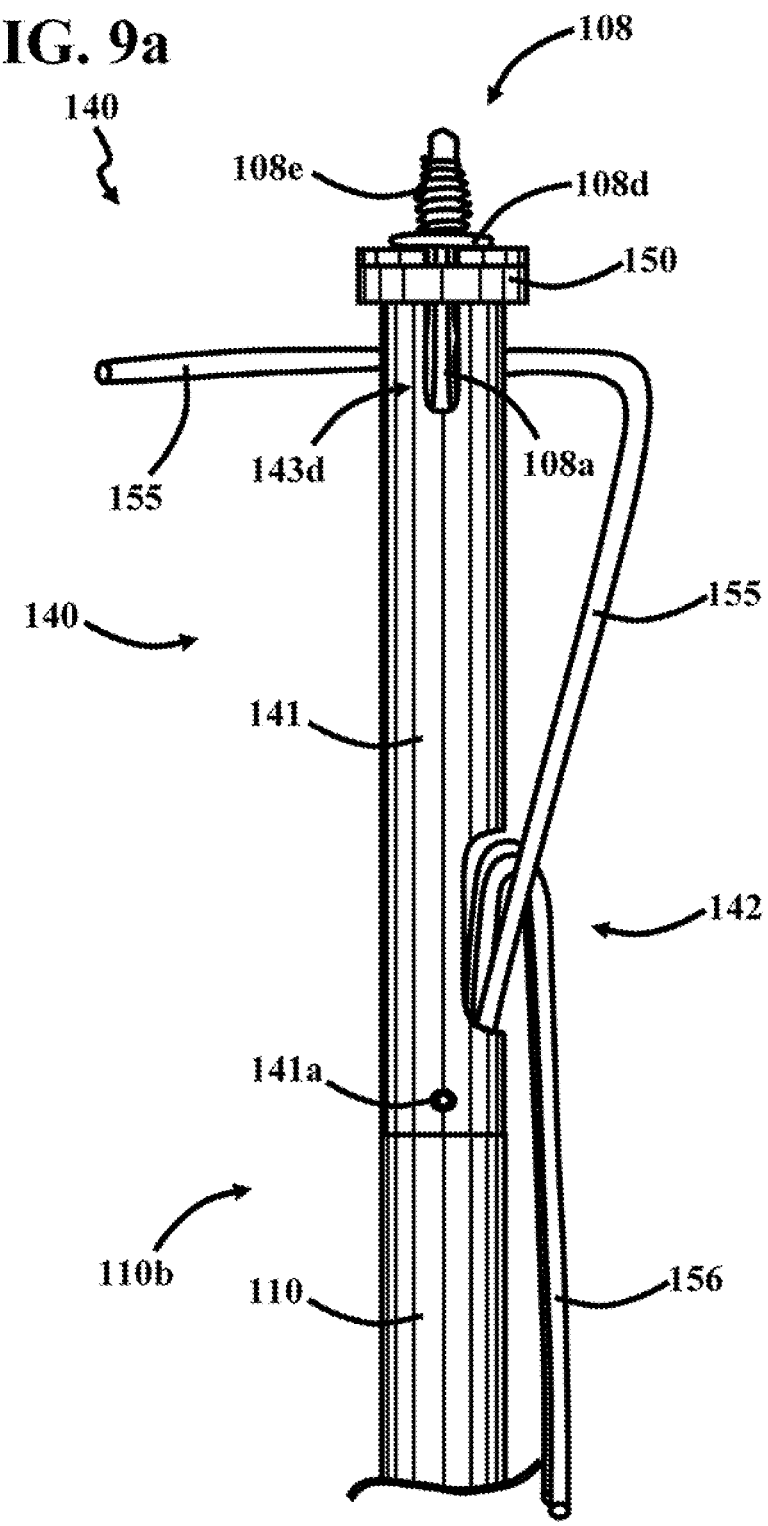

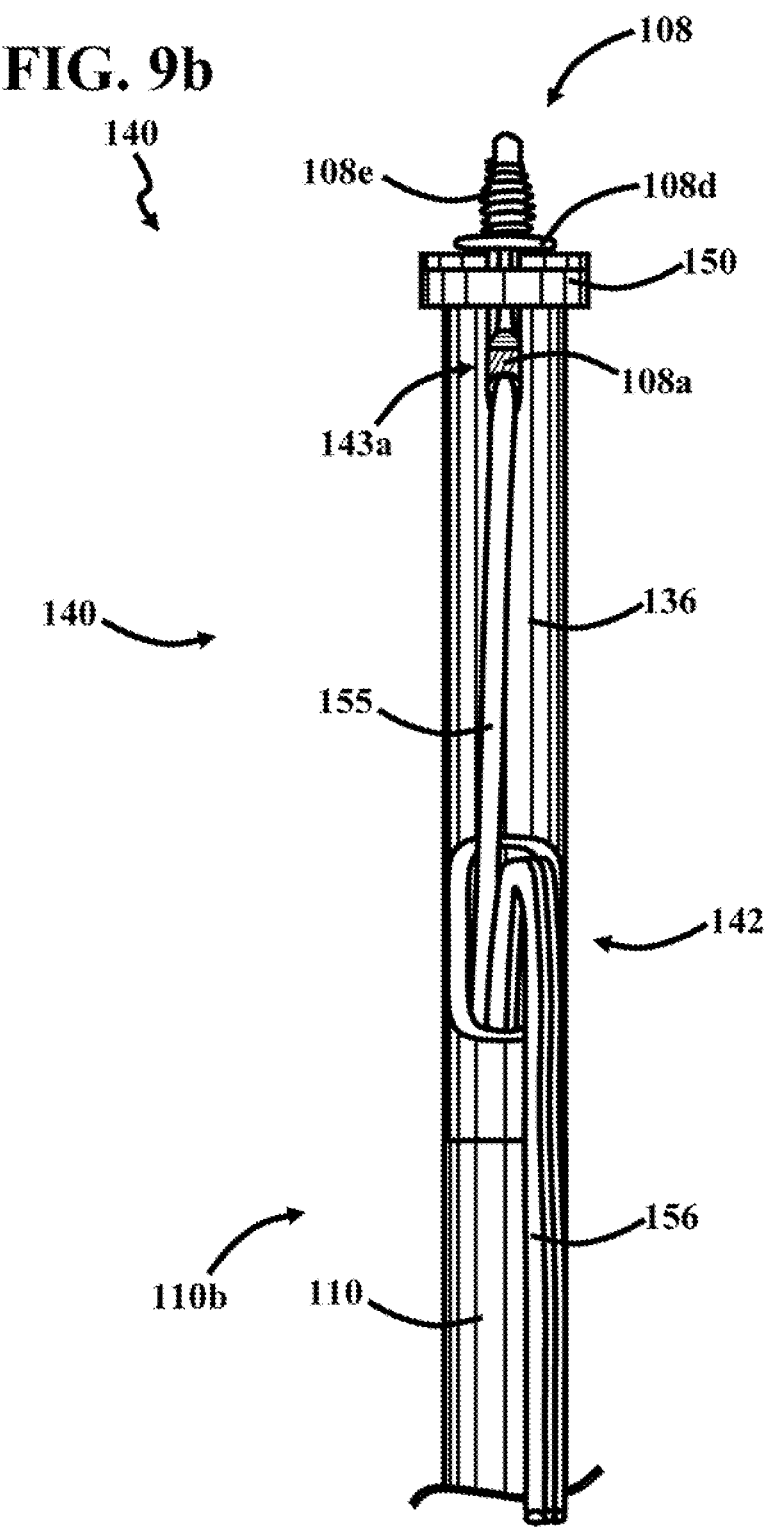

POLE ASSEMBLY

BACKGROUND OF INVENTION

Field of the Invention

This invention relates generally to hand and hoist-line implements.

Description of the Related Art

It is often necessary for a person, such as an electrician, to hoist an object to a height that the electrician cannot reach. For example, an electrician's pole can be used to hoist a screw to a ceiling, wherein the screw is threaded into the ceiling using the pole. One type of electrician's pole is often referred to as a Lagmaster Pole, and it can be used to hoist many different types of objects, such as a wire, threaded and smooth rods, a jack chain and a J-hook. One problem with the available electrician's poles is that they are expensive and limited in size and strength.

BRIEF SUMMARY OF THE INVENTION

The present invention is directed to a pole assembly for hoisting an object. The novel features of the invention are set forth with particularity in the appended claims. The invention will be best understood from the following description when read in conjunction with the accompanying drawings.

BRIEF DESCRIPTION OF THE DRAWINGS

It should be noted that like reference characters are used throughout the various views of the Drawings.

FIGS. 2a and 2b are perspective front and side views, respectively, of one embodiment of an eye lag screw.

FIG. 3 is a perspective view of a conduit.

FIG. 4b is a cut-away perspective view of the chuck taken along a cut-line 3b-3b of FIG. 4a.

FIG. 4c is a cut-away perspective view of the chuck taken along a cut-line 3c-3c of FIG. 4a.

FIGS. 9a and 9b are side and front views, respectively, of the tool coupled to the conduit 110 of FIG. 6.

DETAILED DESCRIPTION OF THE INVENTION

Figure 1:
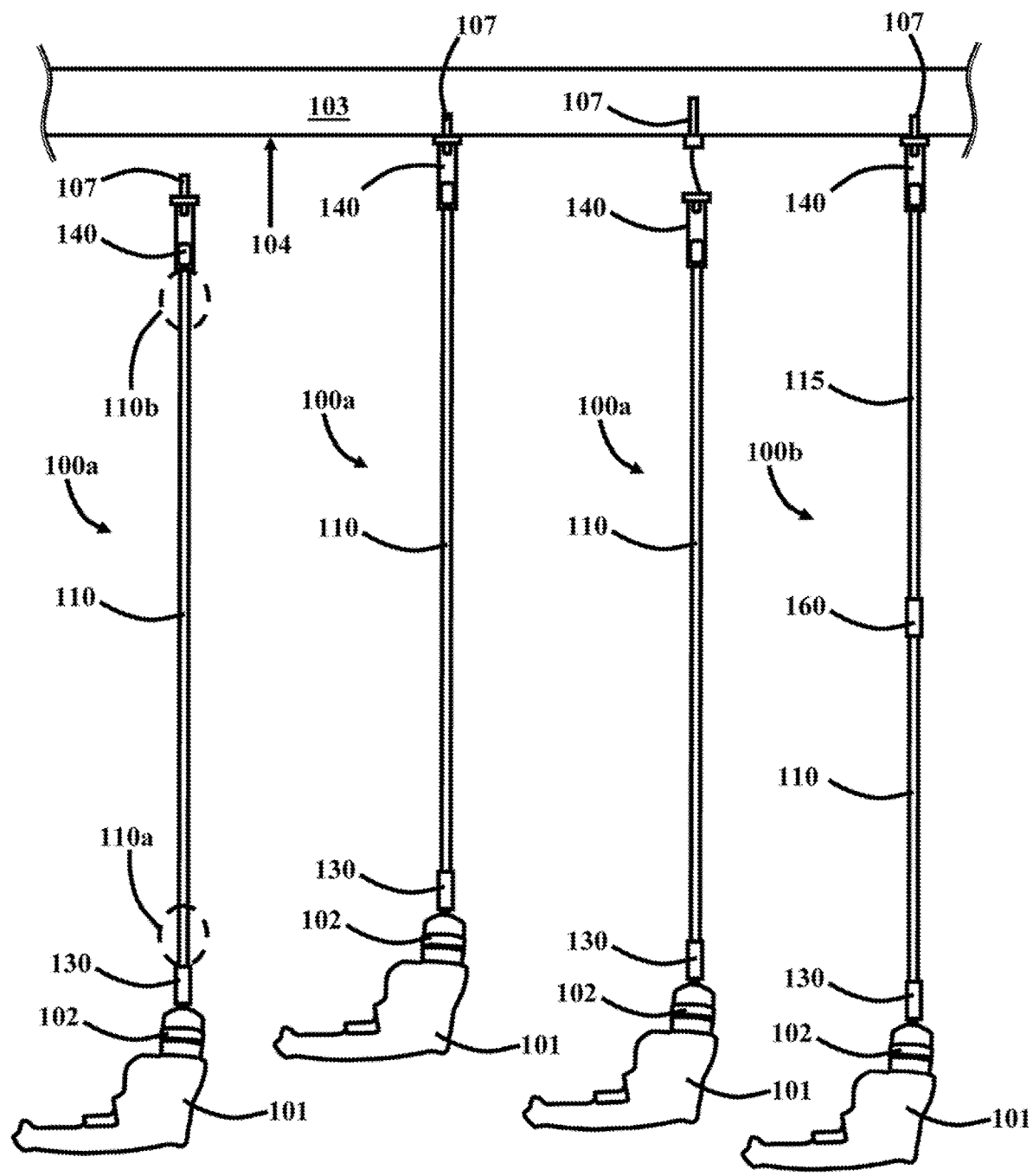
FIG. 1 is a perspective view of various embodiments of a pole assembly.

FIG. 1 is a perspective view of various embodiments of a pole assembly, denoted as pole assemblies 100a and 100b. In these embodiments, the pole assemblies 100a and 100b are operatively coupled to a drill 101 through a drill chuck 102. The pole assemblies 100a and 100b rotate in response to the rotation of the drill chuck 102. The pole assemblies 100a and 100b are used to hoist an eye lag screw 107 so it can be extending through a surface 104 and fastened to a ceiling 103. In general, the eye lag screw 107 is driven through a work piece. The eye lag screw 107 can be of many different types of eye lag screws, one of which is discussed in more detail with FIGS. 2a and 2b. It should be noted that the eye lag screws discussed herein can be left handed or right handed eye lag screws.

In this embodiment, the pole assembly 100a includes a conduit 110, and a chuck 130 and socket piece 140 coupled to opposed proximal and distal ends 110a and 110b, respectively, of the conduit 110. The proximal end 110a is coupled to the drill chuck 102 through the chuck 130, and the distal end 110b is positioned away from the drill chuck 102.

In general, the pole assembly can include one or more pieces of conduit coupled together. For example, the pole assembly 100b includes two piece of conduit 110 and 115 coupled together through a coupler 160. The pole assembly 100b will be discussed in more detail below.

In some embodiments, the conduit consists of electrical conduit. In other embodiments, the conduit consists essentially of electrical conduit. Electrical conduit is used by electricians to house an electrical wire, such as ROMEX. Electrical conduit can be of many different types, such as metal conduit and nonmetal conduit. Examples of metal conduit include rigid metal conduit (RMC), galvanized rigid conduit (GRC), intermediate metal conduit (IMC), electrical metallic tubing (EMT), and aluminum conduit, among others. Examples of nonmetal conduit include rigid nonmetallic conduit (RNC), electrical nonmetallic tubing (ENT), and polyvinyl chloride (PVC) conduit. It should be noted that electrical conduit is typically readily available on a construction site, so it is convenient to use in accordance with the invention. Then conduit can be of many different sizes, such as one-half inch diameter and three quarter inch diameter conduit.

In operation, the drill chuck 102 rotates in response to the operation of the drill 101, and the pole assemblies 100a and 100b rotate in response to the rotation of the drill chuck 102.

In particular, the chuck 130 rotates in response to the rotation of the drill chuck 102. It should be noted that, in general, the drill 101 is a power tool capable of rotating the drill chuck 102.

FIGS. 2a and 2b are perspective front and side views of one embodiment of an eye lag screw, respectively, denoted as an eye lag screw 108. The eye lag screw 108 includes a head 108a with an opening 108b extending therethrough. The eye lag screw 108 includes an unthreaded shaft 108c, which extends from the head 108a. The eye lag screw 108 includes a flange 108c, which extends around the unthreaded shaft 108c. The eye lag screw 108 includes a threaded shaft 108e, which extends from the flange 108d.

The eye lag screw 108 is designed to be fastened to many different materials, such as wood, and drywall. In some embodiments, the ceiling 103 (FIG. 1) includes wood and the surface 104 corresponds to a wood surface.

FIG. 3 is a perspective view of the conduit 110. The conduit 110 can be of many different types, such as electrical conduit used to protect and route electrical wiring. In this embodiment, the conduit 110 includes a conduit body 111 with a conduit body channel 113 extending therethrough. The conduit body channel 113 extends between a proximal conduit body opening 112a and distal conduit body opening 112b. The proximal conduit body opening 112a and the distal conduit body opening 112b are positioned at the proximal end 110a and distal end 110b, respectively, of the conduit 110. The conduit 110 can be coupled to the chuck 130 and socket piece 140 in many different ways, one of which will be discussed in more detail presently.

As mentioned above, the pole assembly 100b of FIG. 1 includes the conduit 115, which can be the same or similar to conduit 110. In some embodiments, the conduits 110 and 115 have the same lengths and, in other embodiments, the conduits 110 and 115 have different lengths. The conduit 115 includes a conduit body 116 with a conduit body channel extending therethrough. The conduit body channel extends between a proximate conduit end 115a and distal conduit end 115b.

Figure 4A:
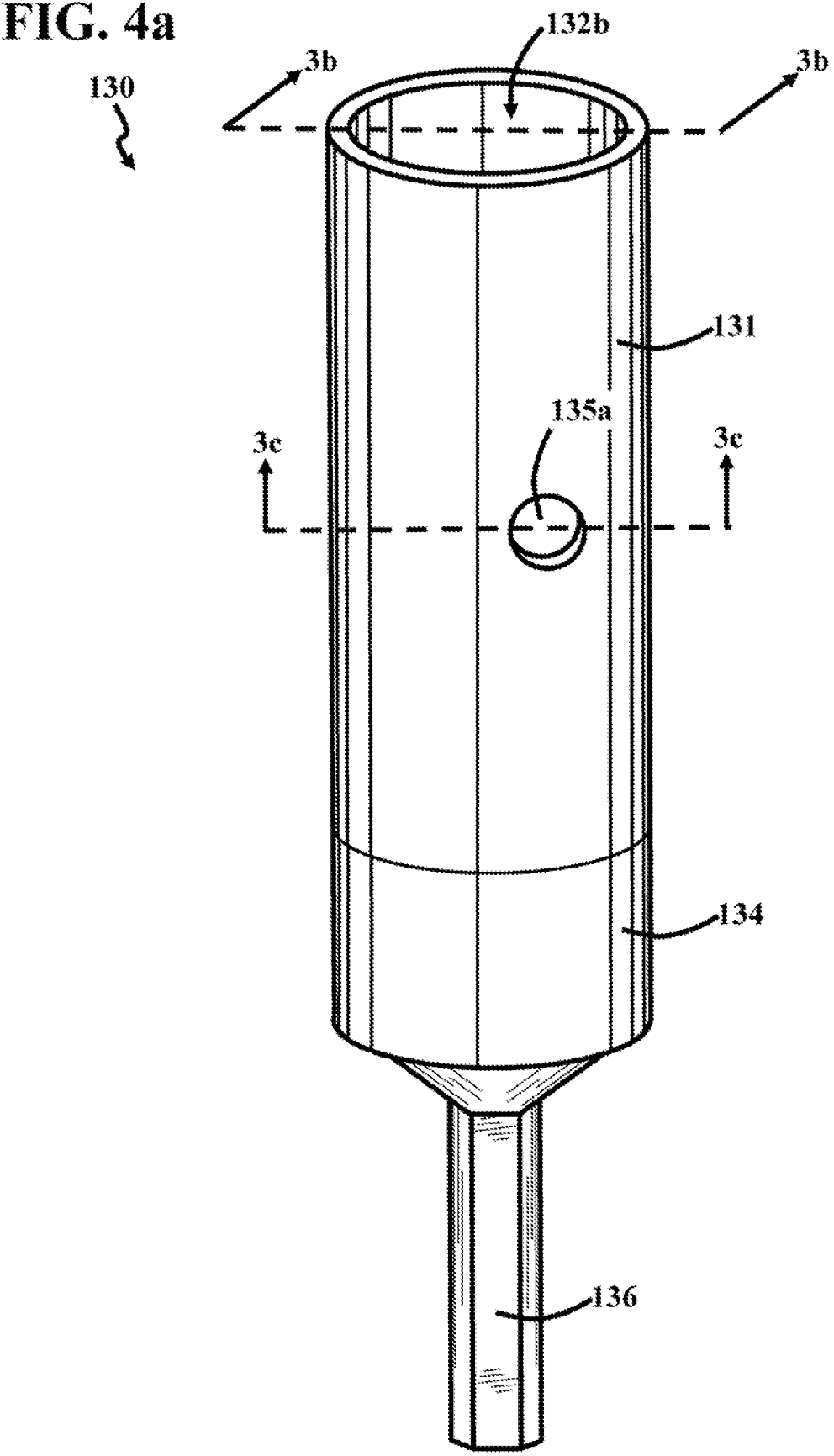
FIG. 4a is a perspective view of one embodiment of a chuck 130, which is used to couple the conduit 110 of FIG. 3 to the drill, as shown in FIG. 1.
Figure 4B:
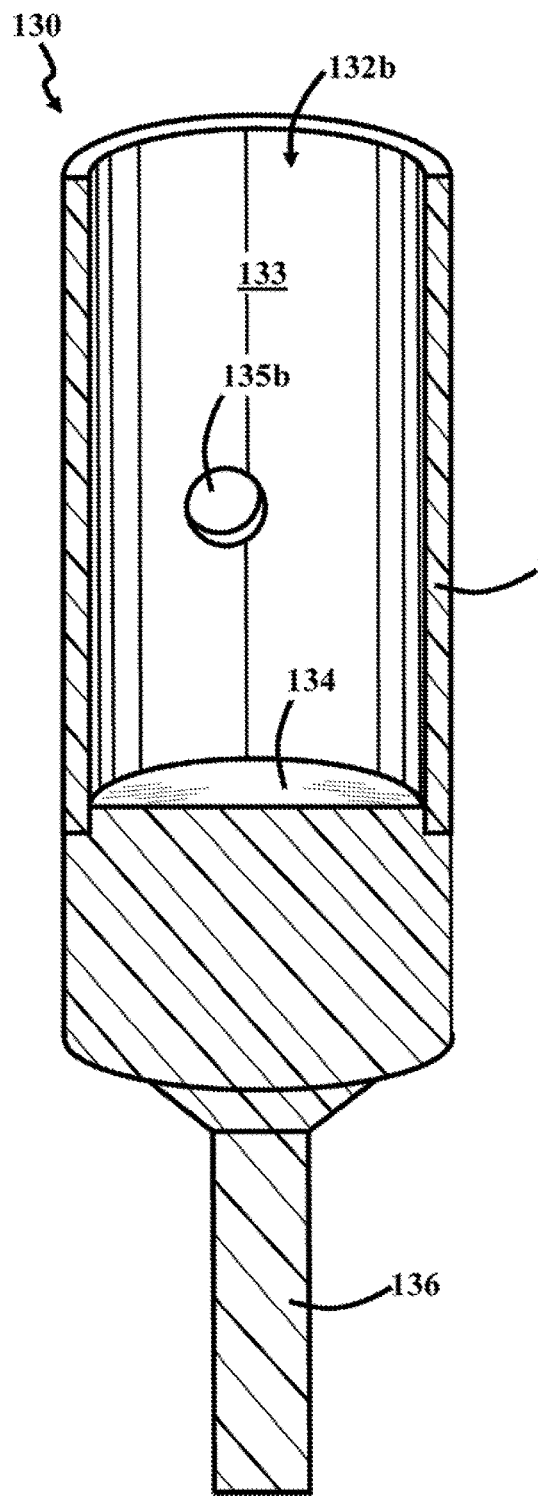
Figure 4C:
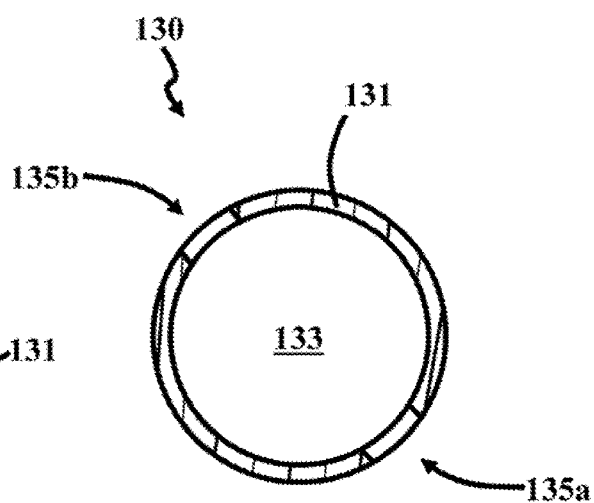

FIG. 4a is a perspective view of one embodiment of the chuck 130, which is used to couple the conduit 110 of FIG. 3 to the drill 101, as shown in FIG. 1. FIG. 4b is a cut-away perspective view of the chuck 130 taken along a cut-line 3b-3b of FIG. 4a, and FIG. 4c is a cut away perspective view of the chuck 130 taken along a cut-line 3c-3c of FIG. 4a.

In this embodiment, the chuck 130 includes a chuck body 131, and a distal chuck body opening 132b at one end. The distal chuck body opening 132b is sized and shaped to receive the proximate conduit end 110a of the conduit 110. A chuck body channel 133 extends through the chuck body 131 and between the distal chuck body opening 132b and a chuck stop piece 134. The chuck 130 includes a shank 136 which extends away from the distal chuck body opening 132b and chuck stop piece 134. The shank 136 is extended through the drill chuck 102 of drill 101, as shown in FIG. 1.

The chuck 130 includes opposed fastener openings 135a and 135b, which extend through the chuck body 131. The fastener openings 135a and 135b are positioned opposed to each other, as shown in FIG. 4c, so that an object, such as a fastener, can be extended through them. Further, the fastener openings 135a and 135b are positioned so that the conduit fastener openings 117a and 117b are aligned with the fastener openings 135a and 135b, respectively, when the proximate conduit end 110a of the conduit 110 is extended through the distal chuck body opening 132b. In this way, a fastener (not shown) can be extended through the fastener openings 135a and 135b and conduit fastener openings 117a and 117b so that the chuck 130 and proximate conduit end 110a of the conduit 110 are coupled together, as shown in FIG. 1.

Figure 5A:
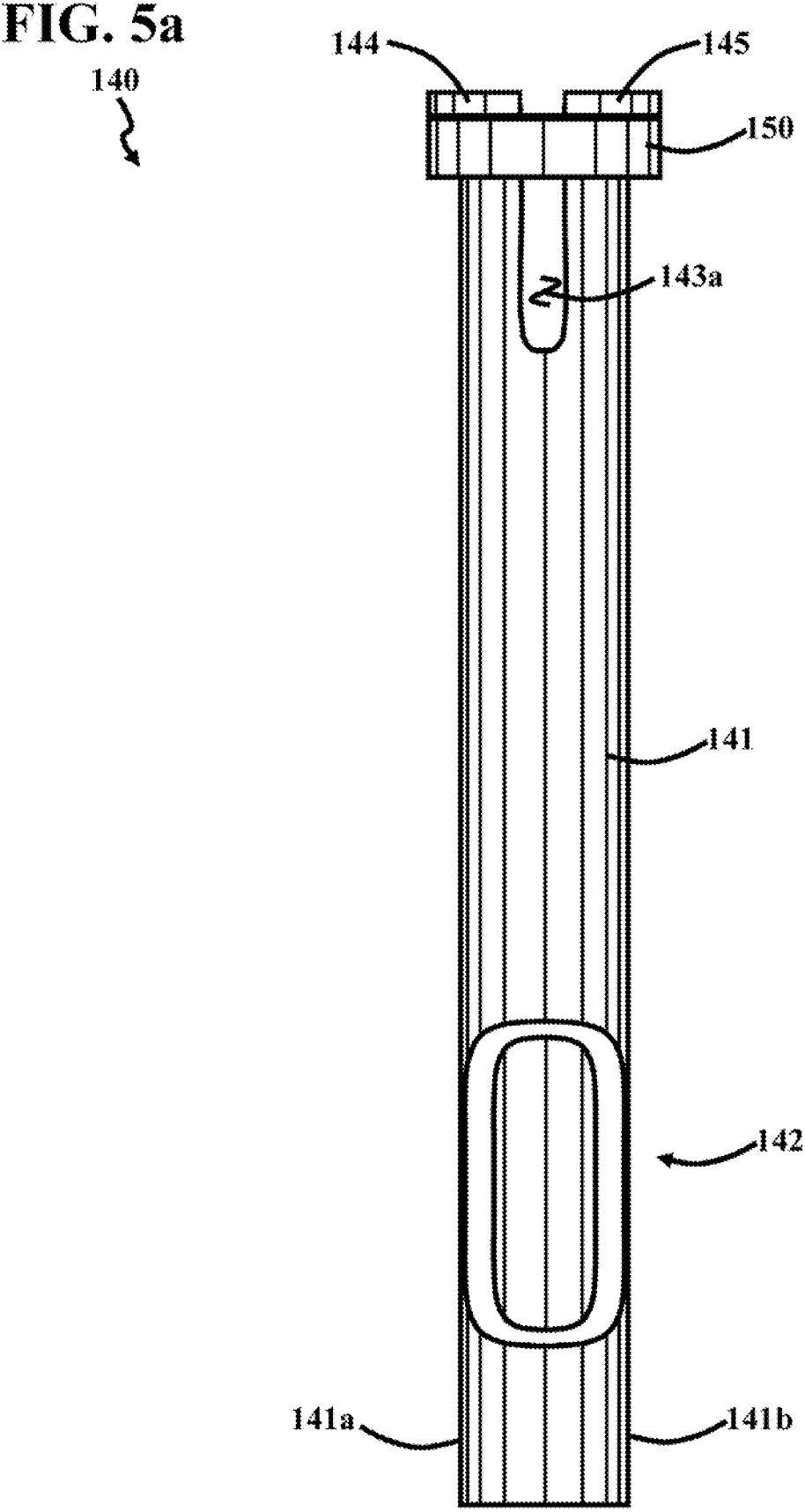
FIGS. 5a and 5b are front and back perspective views, respectively, of a tool of FIG. 1.
Figure 5B:
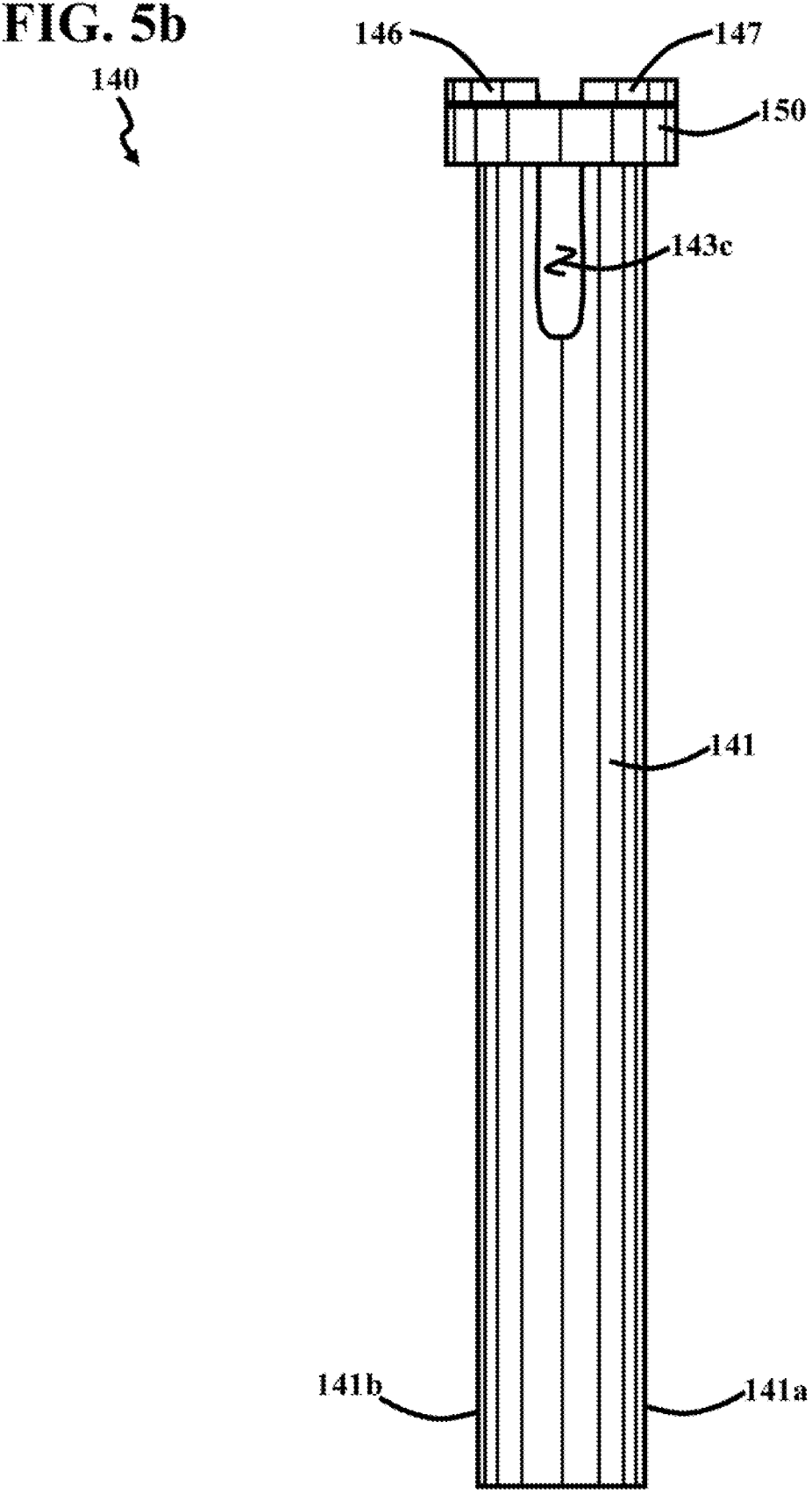
Figure 5C:
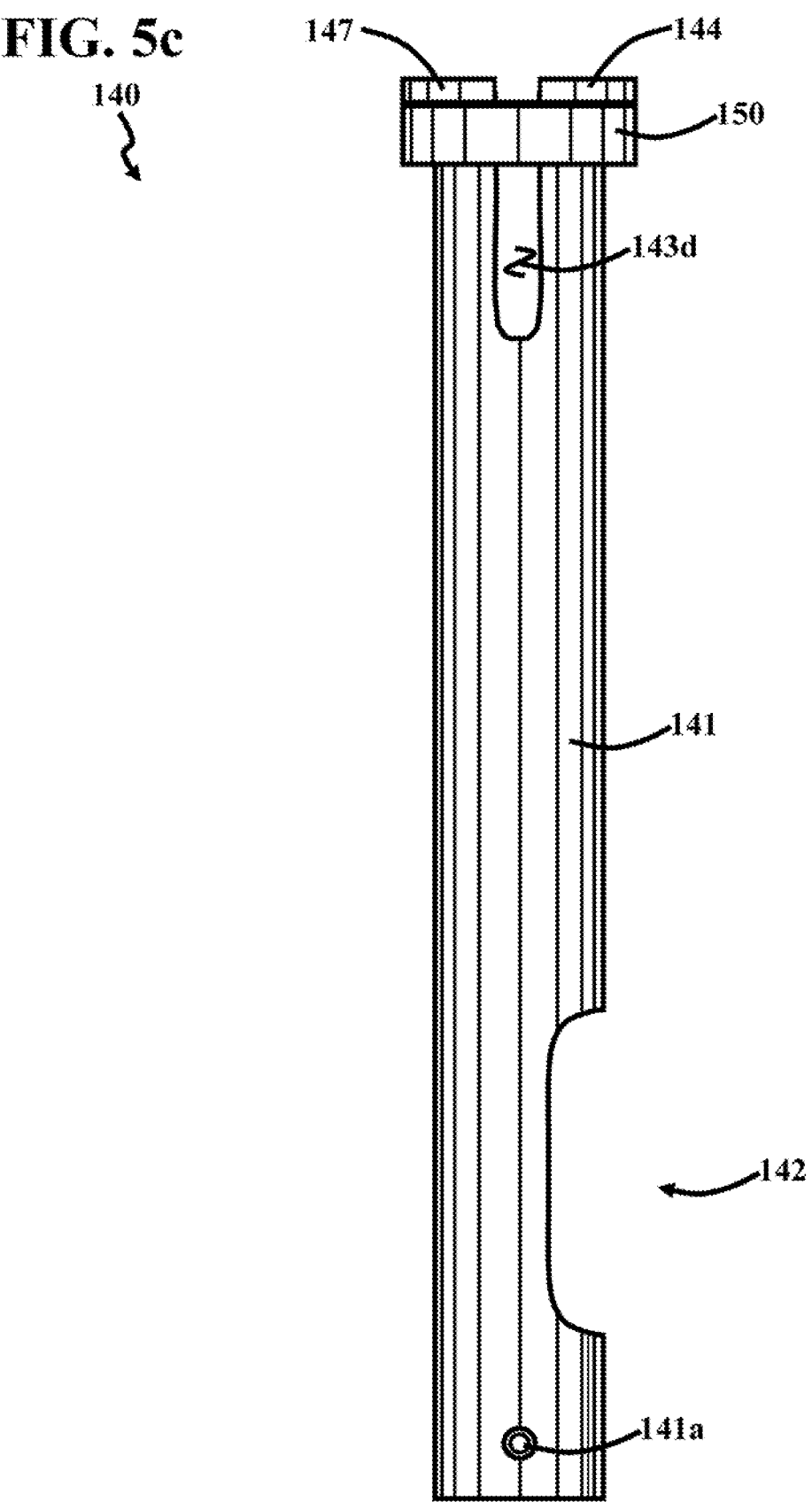
FIGS. 5c and 5d are opposed perspective side views of the tool of FIGS. 5a and 5b.
Figure 5D:
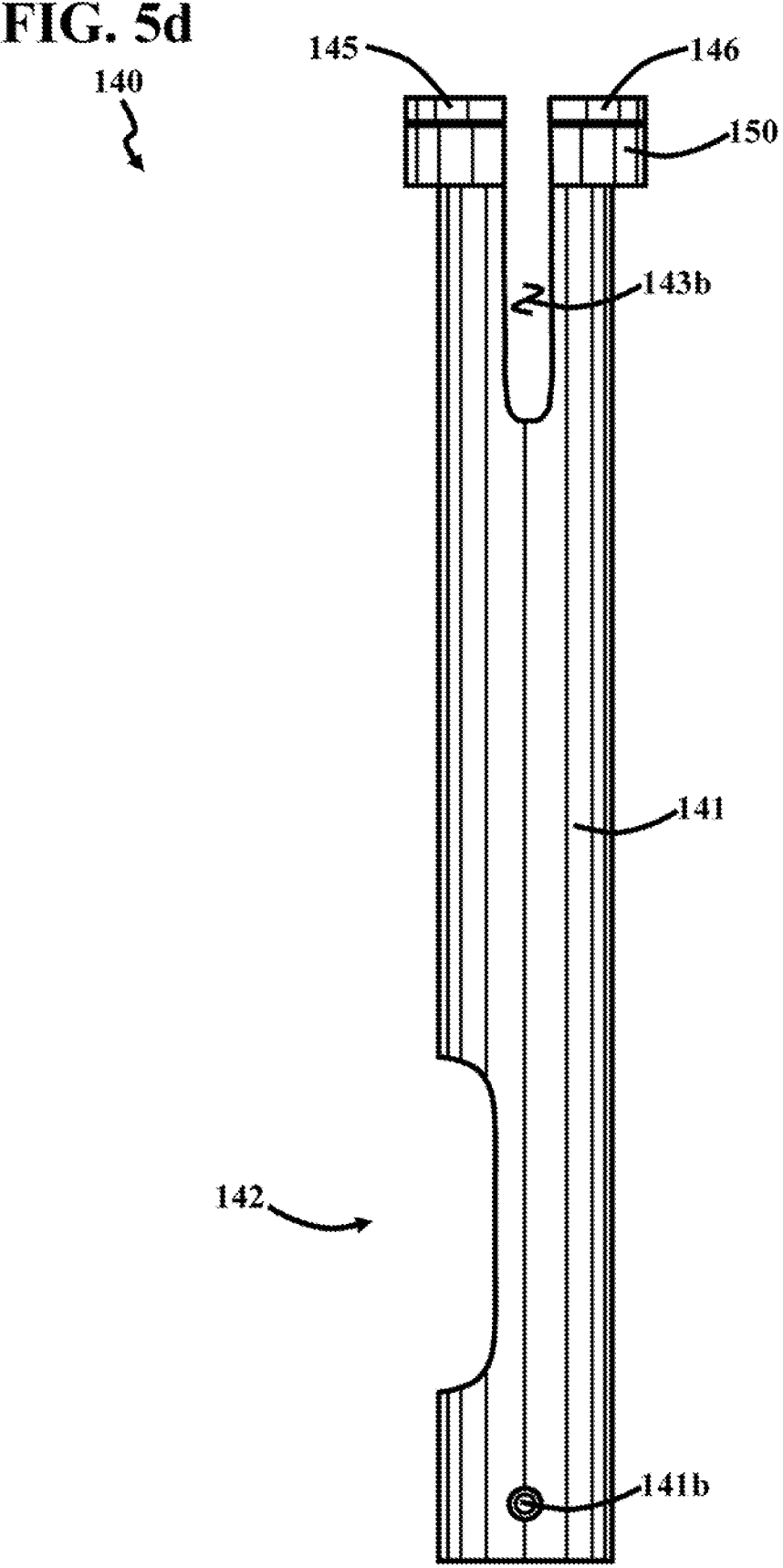
Figure 5E:
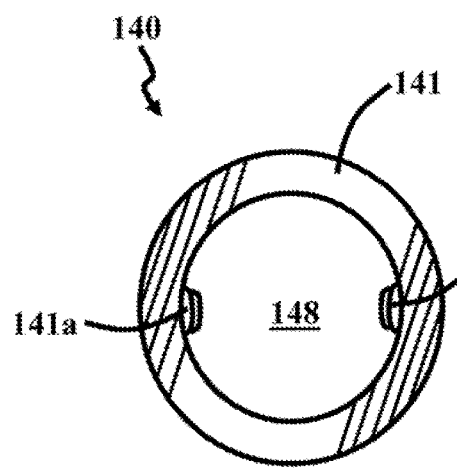
FIGS. 5e and 5f are opposed end views of the tool of FIGS. 5a and 5b.
Figure 5F:
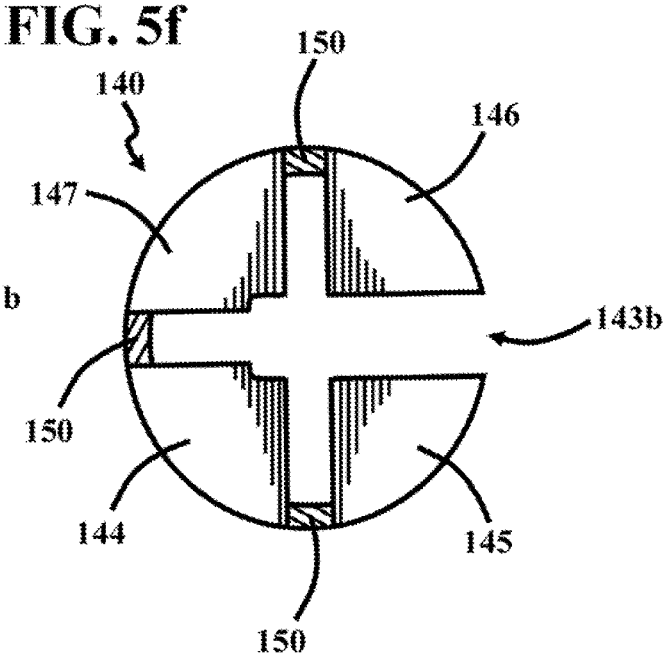

FIGS. 5a and 5b are front and back perspective views, respectively, of a tool 140. FIGS. 5c and 5d are opposed perspective side views of the tool 140 of FIGS. 5a and 5b. FIGS. 5e and 5f are opposed end views of the tool 140. It should be noted that the tool 140 is shown in FIG. 1. It should be noted that the tool 140 can include many different materials, such as metal.

In this embodiment, the tool 140 includes a tool body 141, with a conduit opening 148 (FIG. 5e) extending therethrough. The tool body 141 is generally cylindrical in shape. The conduit opening 148 is sized and shaped to receive a conduit, such as the conduit 110 of FIG. 3, as shown in FIG. 1. The tool 140 includes set screws 141a and 141b, as shown in FIGS. 5c and 5d, respectively. In this embodiment, the set screws 141a and 141b are opposed to each other, as shown in FIG. 5e. The set screws 141a and 141b are threadingly engaged with the tool body 141, and are repeatably movable between coupled and uncoupled positions with the conduit 110 when the conduit 110 extends through the conduit opening 148. In this way, the conduit 110 is repeatably movable between coupled and uncoupled conditions with the tool 140. In the coupled condition, the tool 140 rotates in response to the rotation of the conduit 110.

The tool 141 includes a lower cable opening 142 extending through the tool body 141. The lower cable opening 142 is connected to the conduit opening 148, as will be discussed in more detail below. It should be noted that the set screws 141a and 141b are positioned proximate to the conduit opening 148 and lower cable opening 142.

The tool 141 includes a plurality of flanged portions positioned away from the conduit opening, as shown in FIG. 5f. In general, the tool 141 includes one or more flanged portions. In this embodiment, the tool 141 includes flanged portions 144, 145, 146, and 147. The flanged portions 144 and 145 are spaced apart from each other by an upper cable opening 143a, as shown in FIG. 5a. The upper cable opening 143a is positioned proximate to the front of the tool body 141.

The tool 141 includes flanged portions 146 and 147, which are spaced apart from each other by an upper cable opening 143c, as shown in FIG. 5b. The upper cable opening 143c is positioned proximate to the rear of the tool body 141. It should be noted that the upper cable openings 143a and 143c are opposed to each other.

The flanged portions 147 and 144, are spaced apart from each other by an upper cable opening 143d, as shown in FIG. 5c. The upper cable opening 143d is positioned proximate to a first side of the tool body 141.

The flanged portions 145 and 146, are spaced apart from each other by an upper cable opening 143d, as shown in FIG. 5d. The upper cable opening 143b is positioned proximate to a second side of the tool body 141. It should be noted that the upper cable openings 143b and 143d are opposed to each other.

Figure 5G:
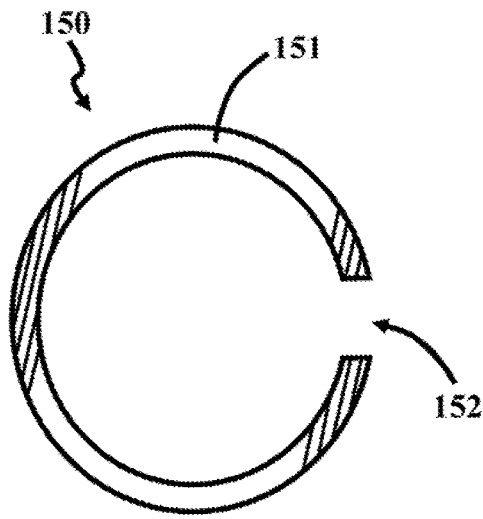
FIGS. 5g and 5h are top and side views, respectively, of a ring of the tool of FIGS. 5a and 5b.
Figure 5H:
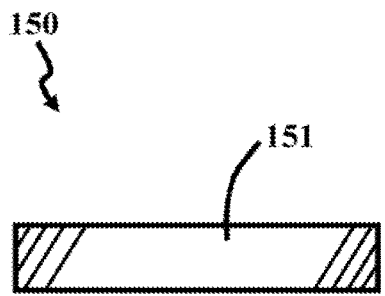

The tool 140 includes a ring 150, which is positioned away from the conduit opening. The ring 150 is shown in FIGS. 5a-5d, and FIG. 5f. Further, FIG. 5g is a top view of the ring 150, and FIG. 5h is a side view of the ring 150. In this embodiment, the ring 150 includes a ring body 151, which is generally circular in shape. The ring 150 includes a ring opening 152, which extends through the ring body 151. The ring 150 is coupled to the tool body 141, so it extends around it. In particular, the ring 150 engages the flanged portions 144, 145, 146, and 147. The ring 150 is positioned so that the ring opening 152 is proximate to the upper cable opening 143b, as shown in FIG. 5d. Further, the ring 150 is positioned so that the ring opening 152 is positioned away from the upper cable opening 143d.

Figure 6:
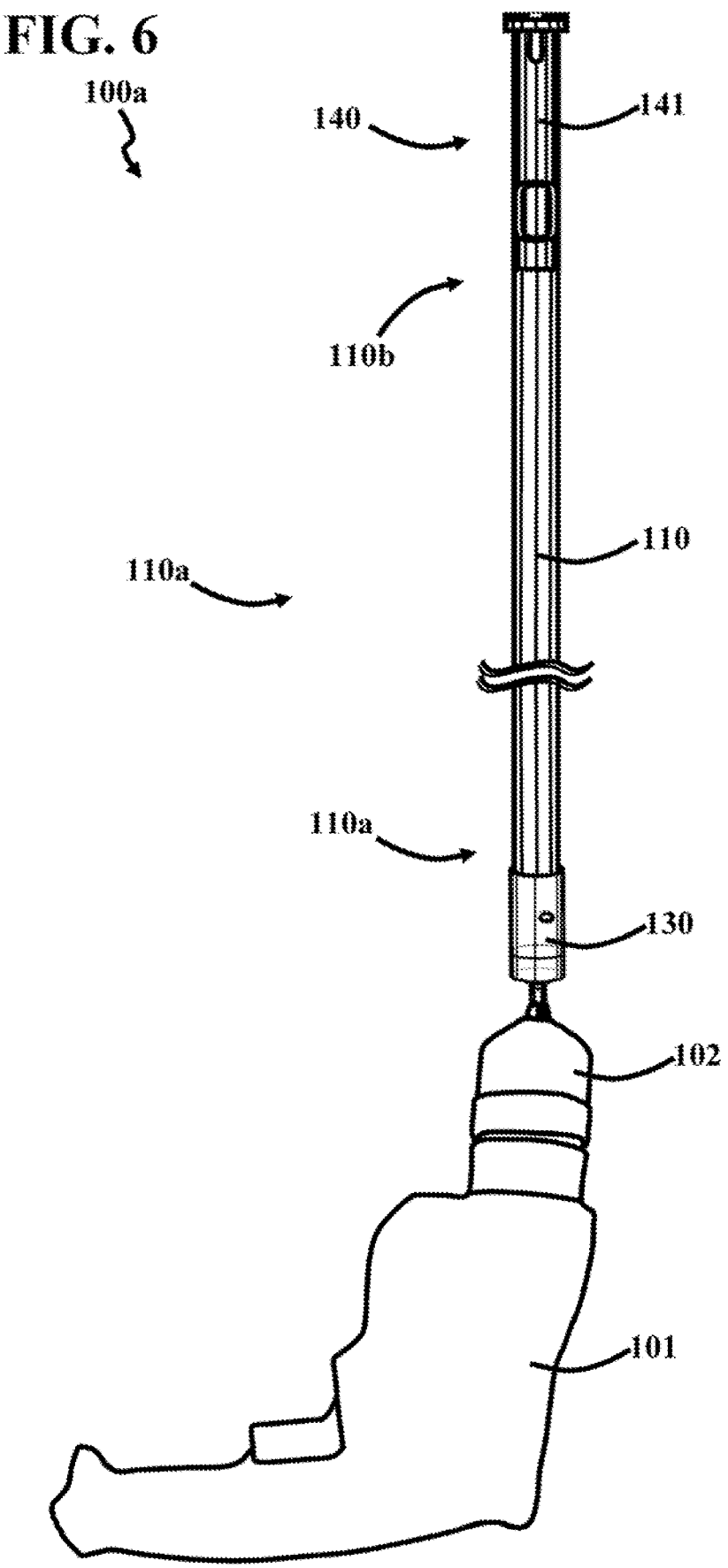
FIG. 6 is a perspective view of the pole assembly.

FIG. 6 is a perspective view of the pole assembly 100a. In this embodiment, the pole assembly 100a is operatively coupled to the drill 101 through the drill chuck 102. The pole assembly 100a rotates in response to the rotation of the drill chuck 102. The pole assembly 100a includes the conduit 110, and the chuck 130 and tool 140 coupled to opposed proximal and distal ends 110a and 110b (FIG. 1), respectively, of the conduit 110. The proximal end 110a is coupled to the drill chuck 102 through the chuck 130, and the distal end 110b is positioned away from the drill chuck 102.

As discussed in more detail above with FIGS. 1, 2 and 3, the pole assembly 100a is used to hoist an eye lag screw (not shown) so it can be extending through a surface and fastened to a ceiling. As will be discussed in more detail presently, the tool 140 allows the eye lag screw to by fastened to the ceiling, and the tool 140 allows a wire to be coupled to the eye lag screw.

Figure 7A:
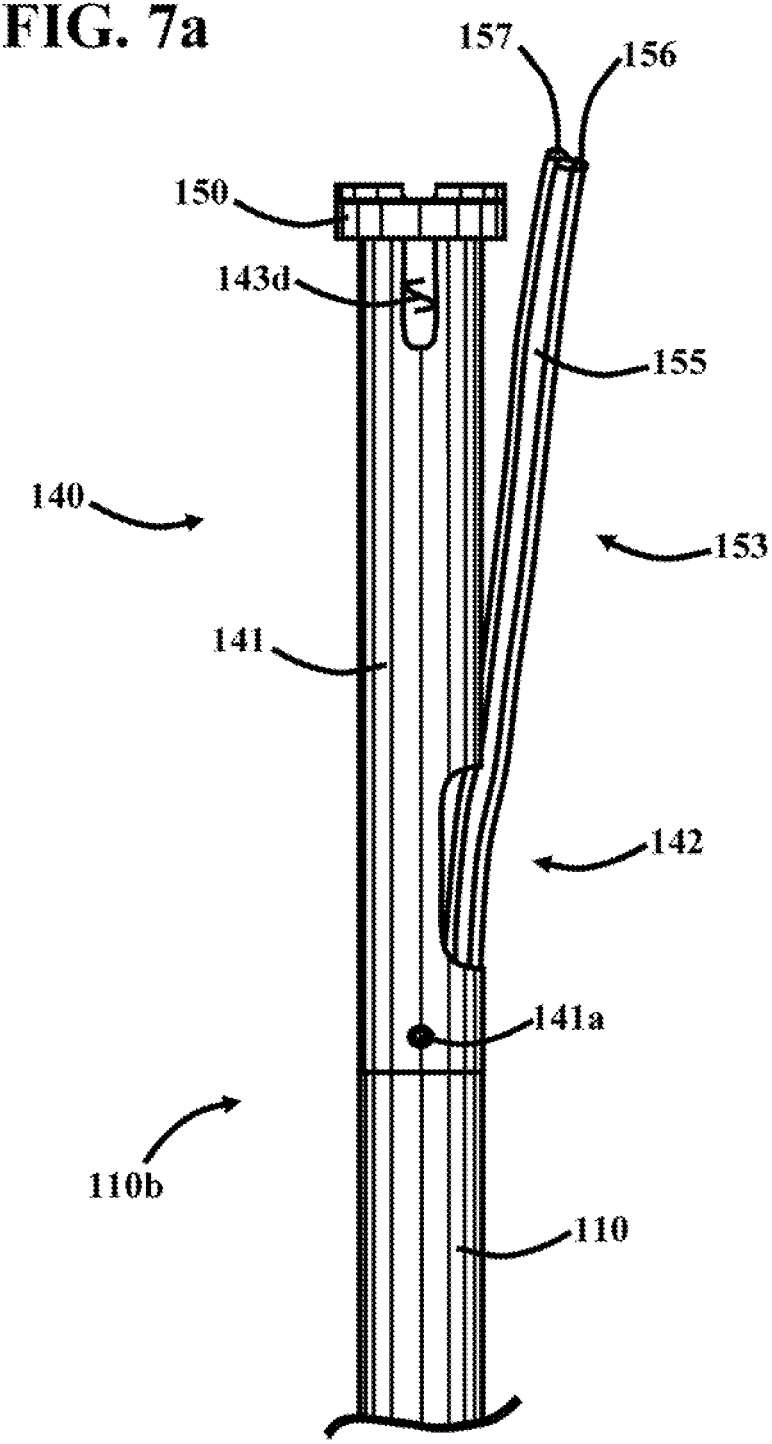
FIGS. 7a and 7b are side and front views, respectively, of the tool of FIG. 6 coupled to the conduit of FIG. 3.
Figure 7B:
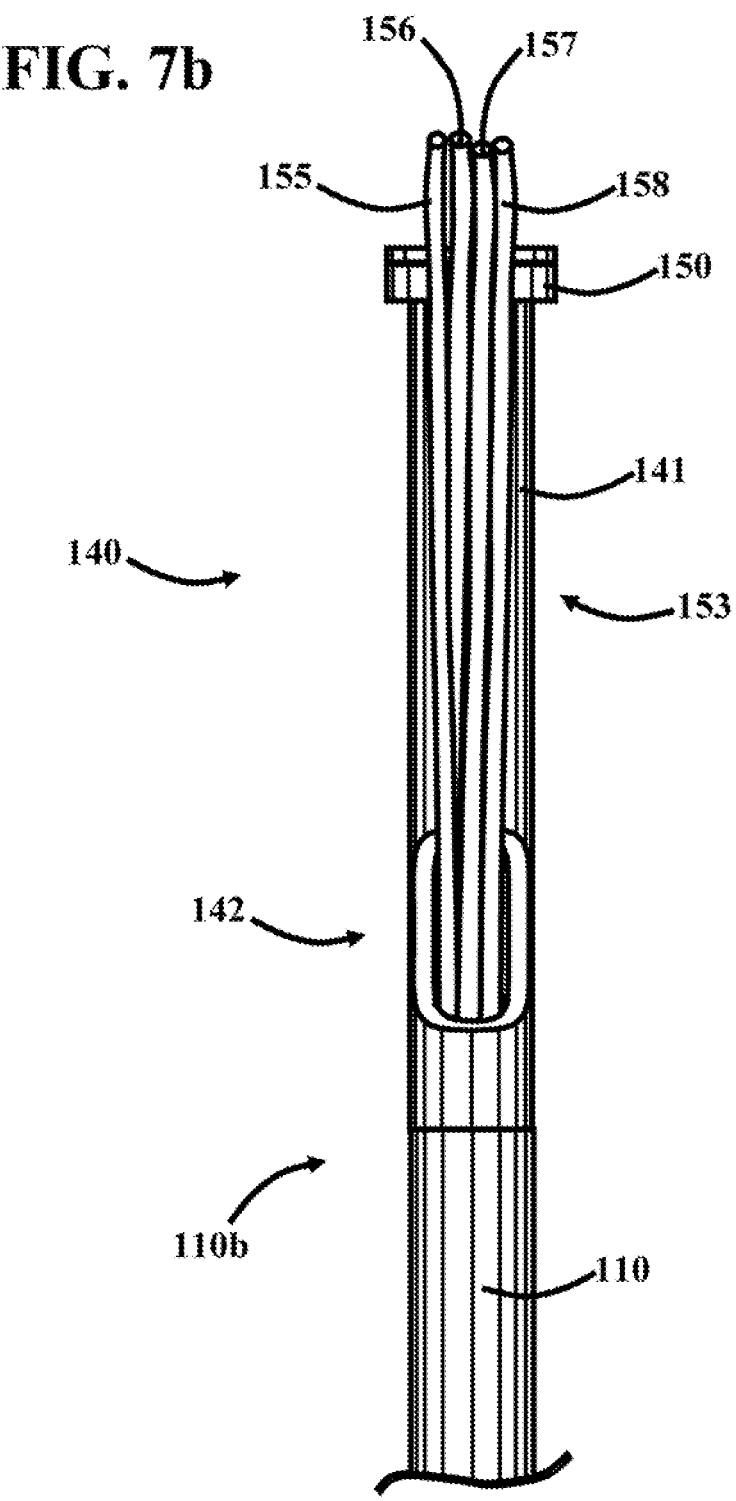

FIGS. 7a and 7b are side and front views, respectively, of the tool 140 coupled to the conduit 110. It should be noted that FIG. 7a corresponds to the side view of the tool 140 of FIG. 5c, and FIG. 7b corresponds to the front view of tool 140 of FIG. 5a.

In this embodiment, a wire bundle 153 is extended through the lower cable opening 142. In general, the wire bundle 153 includes one or more wires. The wire can be of many different types. In this embodiment, the wire bundle 153 includes grid wire. The wires of the wire bundle 153 are denoted as wires 155, 156, 157, and 158 (FIG. 7b).

The wire bundle 153 is extended through the conduit opening 148 (FIG. 5e). The wire bundle 153 is extended through the distal conduit body opening 112b (FIG. 3). The wire bundle 153 is extended through the lower cable opening 142 and conduit opening 148. The wire bundle 153 is extended through the lower cable opening 142, conduit opening 148, and distal conduit body opening 112b.

Figure 8A:
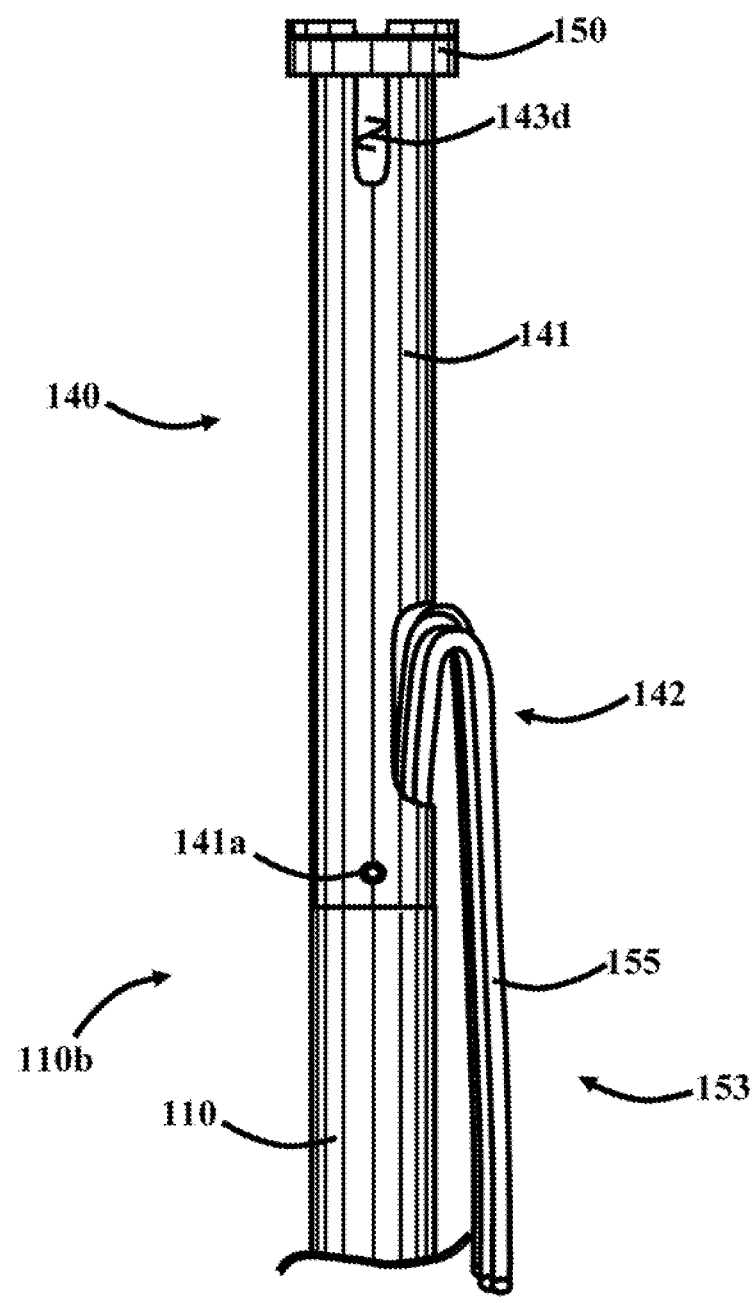
FIGS. 8a and 8b are side views of the tool coupled to the conduit, as shown in FIG. 6.
Figure 8B:
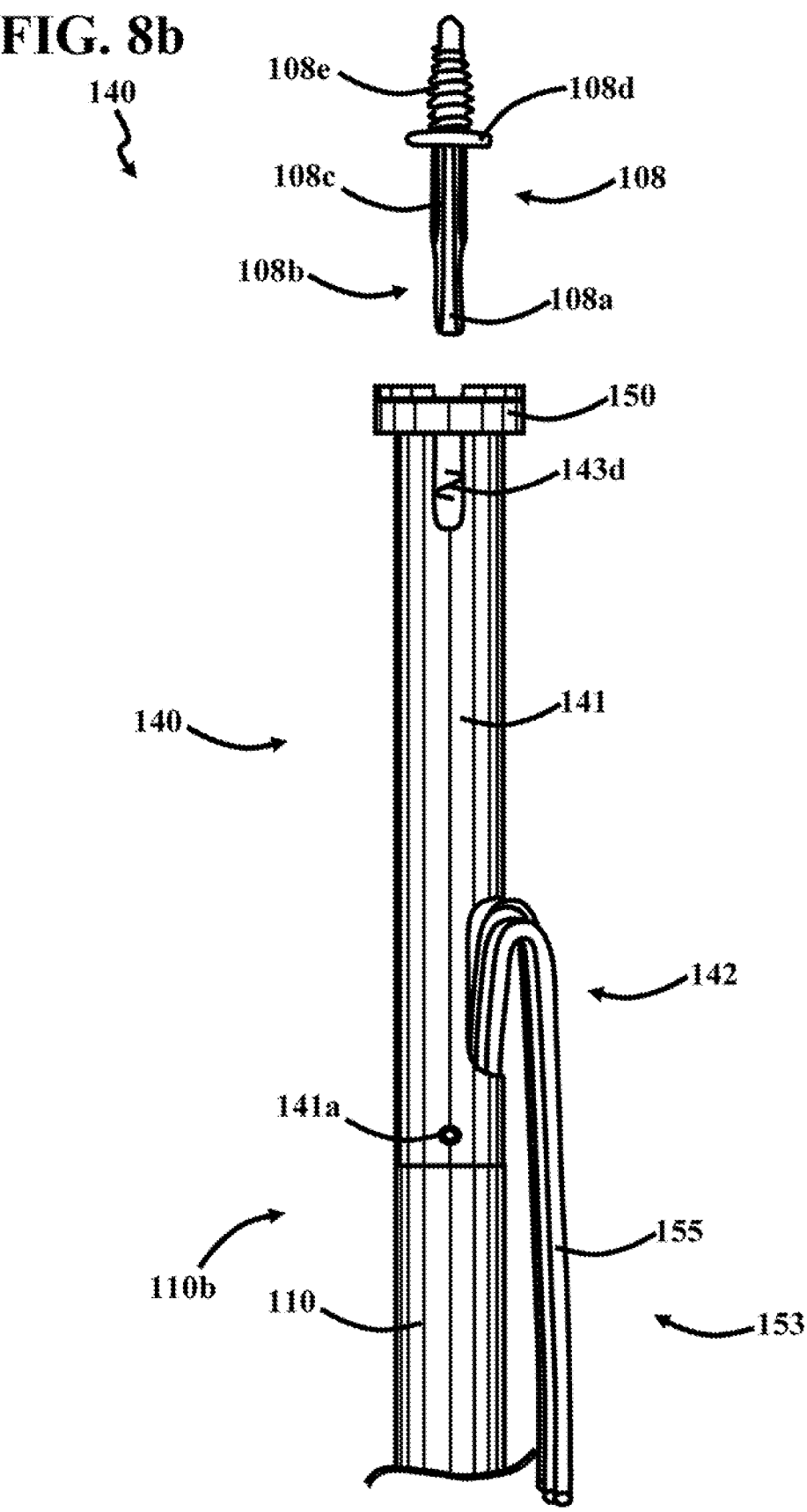

FIGS. 8a and 8b are side views of the tool 140 coupled to the conduit 110. It should be noted that FIGS. 8a and 8b correspond to the side view of the tool 140 of FIG. 7a, wherein the wire bundle 153 has been positioned as described in more detail above with FIGS. 7a and 7b. In FIGS. 8a and 8b, however, the wire bundle 153 has been bent downwardly, as shown. In FIG. 8b, the eye lag screw 108 (FIGS. 2a and 2b) is positioned proximate to the ring 150.

FIGS. 9a and 9b are side and front views, respectively, of the tool 140 coupled to the conduit 110. It should be noted that FIG. 9a corresponds to the side view of the tool 140 of FIG. 7a, and FIG. 9b corresponds to the front view of the tool 140 of FIG. 7b. Further, the side view of FIG. 8a corresponds to the side view of the tool 140 of FIGS. 8a and 8b.

In FIGS. 9a and 9b, the eye lag screw 108 is moved so the head 108a and unthreaded shaft 108c are extended through the space between the flanges 144 and 147 (FIG. 5f). Further, the eye lag screw 108 is moved so the head 108a and unthreaded shaft 108c are extended through the space between the flanges 145 and 146 (FIG. 5f). The eye lag screw 108 is positioned so that the opening 108b faces the upper cable opening 143a (FIG. 9b). Further, the eye lag screw 108 is positioned so that the opening 108b faces the upper cable opening 143c.

In FIGS. 9a and 9b, the wire 155 is moved through the upper cable opening 143a, as shown. The wire 155 is moved through the head 108a. Further, the wire 155 is moved through the upper cable opening 143c. In this way, the wire 155 is coupled to the eye lag screw 108.

Figure 10A:
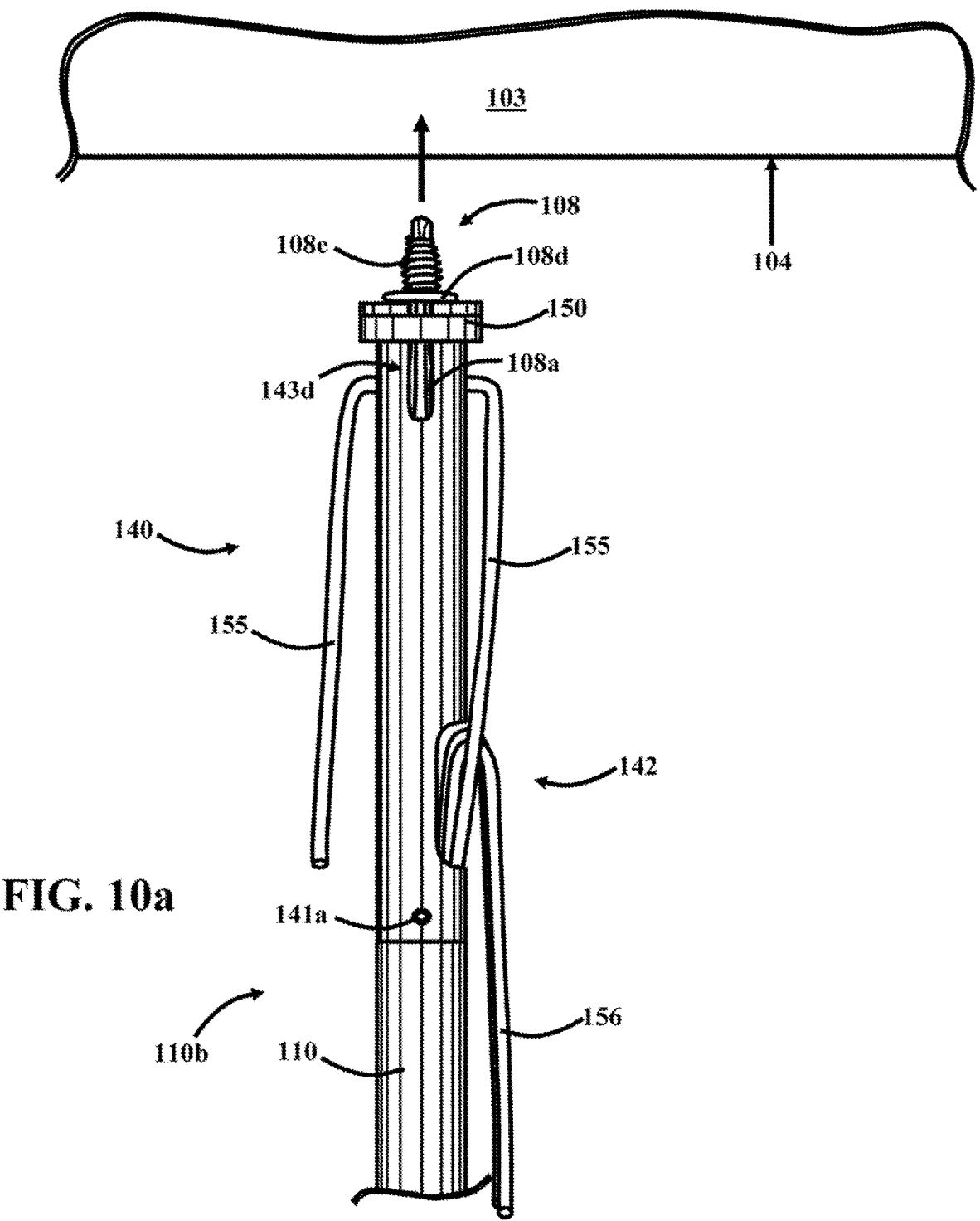
FIGS. 10a and 10b are perspective side views of the tool positioned away from and towards the ceiling (FIG. 1), respectively.
Figure 10B:
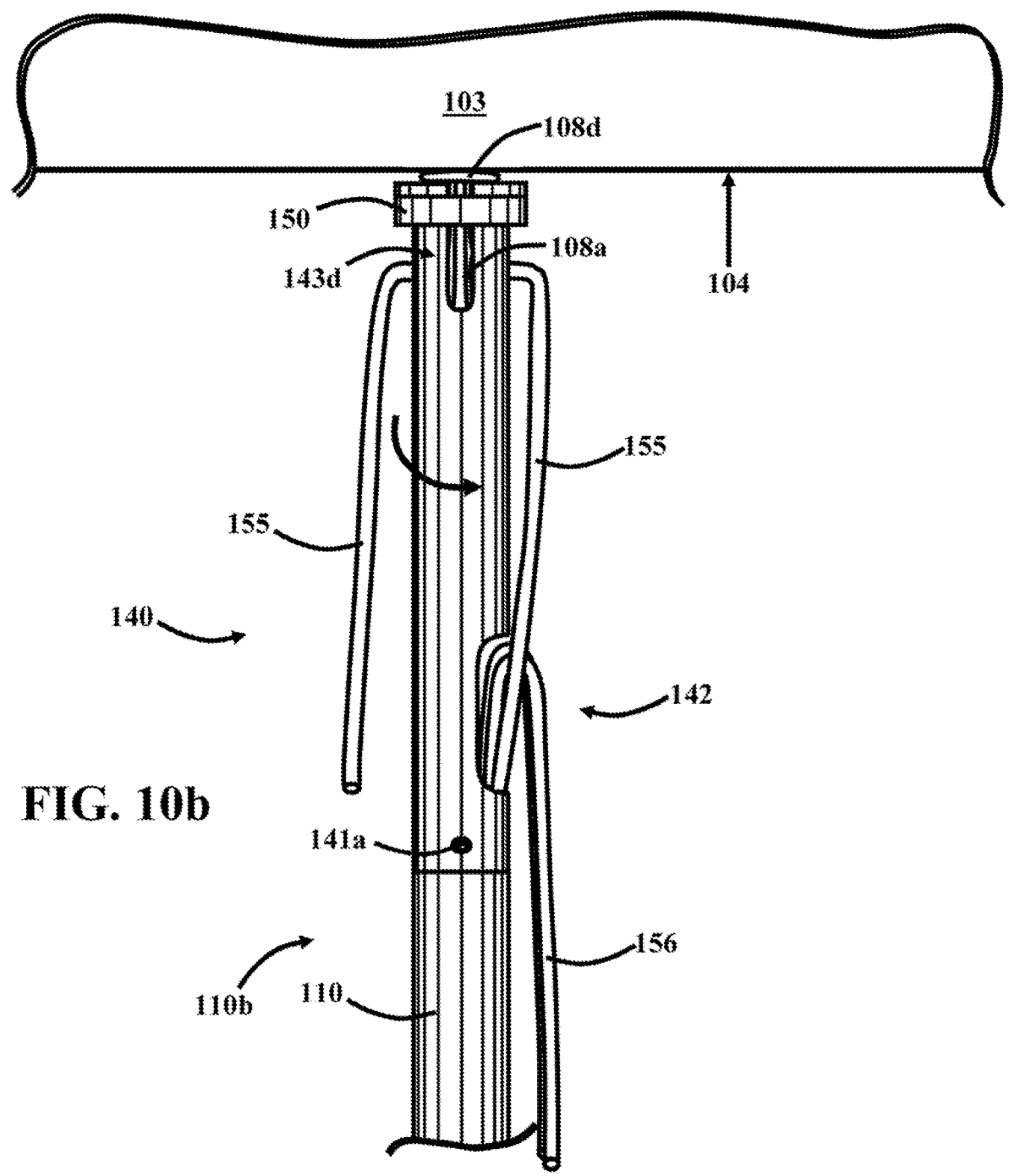

FIGS. 10a and 10b are perspective side views of the tool 140 positioned away from and towards the ceiling 103 (FIG. 1), respectively. It should be noted that the side view corresponds to the side view of FIG. 9a. In this embodiment, the threaded shaft 108e faces the surface 104. The threaded shaft 108e can be positioned so it faces the surface 104 in many different ways. In this embodiment, the conduit 110 is used to move the tool 140 so that the ring 150 is proximate to the ceiling 103. Further, the conduit 110 is used to move the tool 140 so that the lower cable opening 142 is away from the ceiling 103.

As shown in FIG. 10b, the eye lag screw 108 is moved towards the ceiling 103. In particular, the eye lag screw 108 is moved towards the surface 104. The threaded shaft 108e is driven through the ceiling 103 in response to the rotation of the tool 140. As discussed in more detail above, the tool 140 rotates in response to the rotation of the conduit 110. As shown in FIG. 6, the conduit 110 rotates in response to the rotation of the chuck 130, and the chuck 130 rotates in response to the rotation of the drill chuck 102. Further, the drill chuck 102 rotates in response to the operation of the drill 101. In this way, the eye lag screw 108 is coupled to the ceiling 103. It should be noted that the flange 108d engages the ceiling 103 in response to the eye lag screw 108 being coupled to the ceiling 103.

In this embodiment, the threaded shaft 108e is driven through the surface 104 in response to the rotation of the tool 140. As discussed in more detail above, the tool 140 rotates in response to the rotation of the conduit 110. As shown in FIG. 6, the conduit 110 rotates in response to the rotation of the chuck 130, and the chuck 130 rotates in response to the rotation of the drill chuck 102. Further, the drill chuck 102 rotates in response to the operation of the drill 101. In this way, the eye lag screw 108 is coupled to the surface 104. It should be noted that the flange 108d engages the surface 104 in response to the eye lag screw 108 being coupled to the surface 104.

Figure 10C:
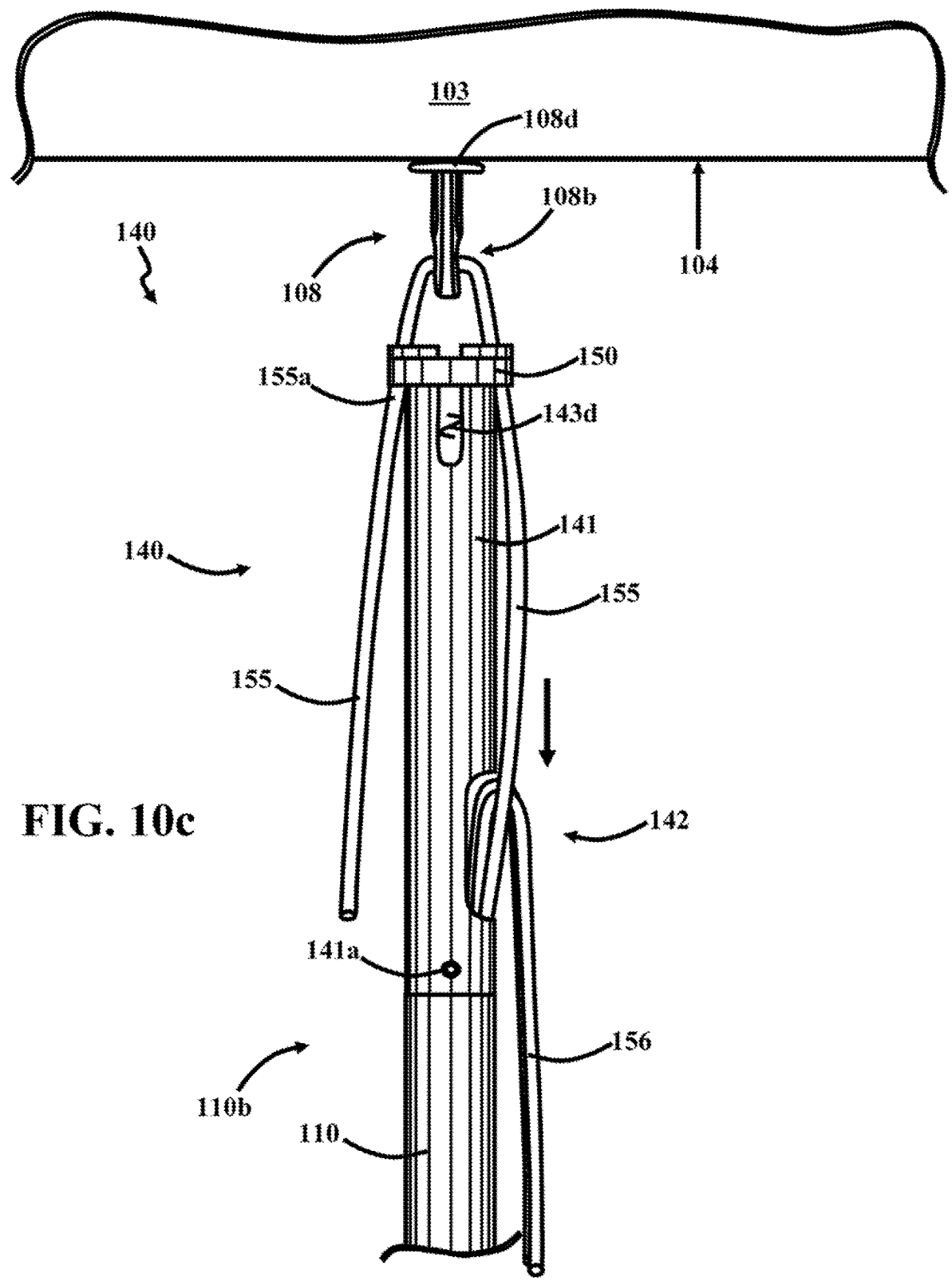
FIG. 10c is a perspective side view of the tool positioned away from the ceiling (FIG. 1), and the eye lag screw coupled to the ceiling.

FIG. 10c is a perspective side view of the tool 140 positioned away from the ceiling 103 (FIG. 1), and the eye lag screw 108 coupled to the ceiling 103. It should be noted that the side view corresponds to the side view of FIG. 9a.

In this embodiment, the wire 155 is coupled to the eye lag screw 108, as discussed in more detail above. In particular, the wire 155 extends through the opening 108b of the head 108a. The rotation of the tool 140 moves a distal portion 155a of the wire 155 so it extends through the upper cable opening 143c.

Figure 10D:
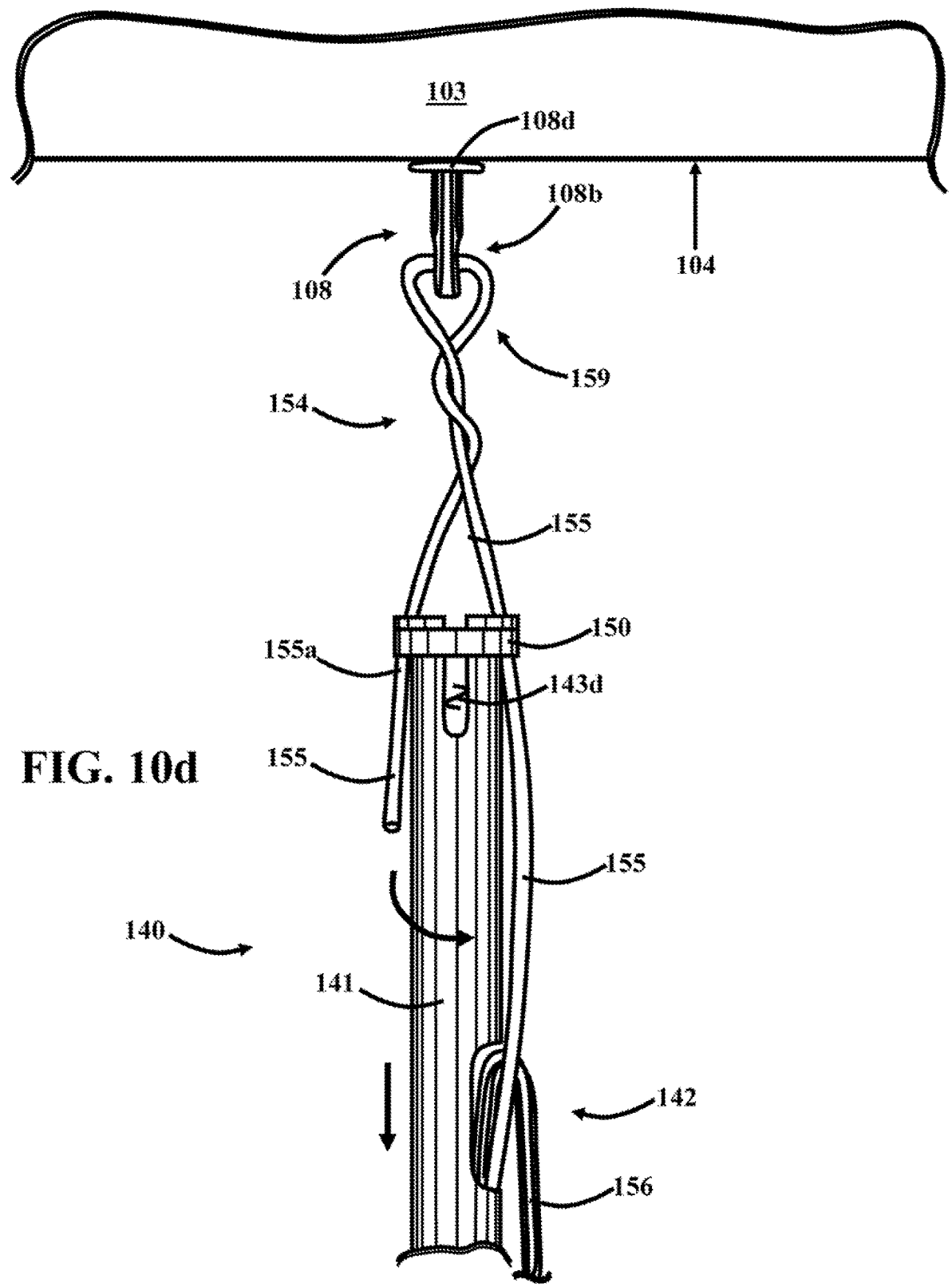
FIG. 10d is a perspective side view of the tool moving away from the ceiling (FIG. 1), and the eye lag screw coupled to the ceiling and the wire coupled to the eye lag screw.

FIG. 10d is a perspective side view of the tool 140 moving away from the ceiling 103 (FIG. 1), and the eye lag screw 108 coupled to the ceiling and the wire 155 coupled to the eye lag screw 108. In this embodiment, the tool 140 rotates so the wire 155 forms one or more twists. For example, twists 154 are formed in response to tool 140 rotating. The twists 154 are formed because the wire 155 extends through the upper cable openings 143a and 143c, as discussed above, and the tool 140 is rotated in response to rotating the conduit 110. A loop 159 is formed in response to the twists 154 forming. The loop 159 extends through the opening 108b of the head 108a, and holds the wire 155 to the eye lag screw 108.

Figure 10E:
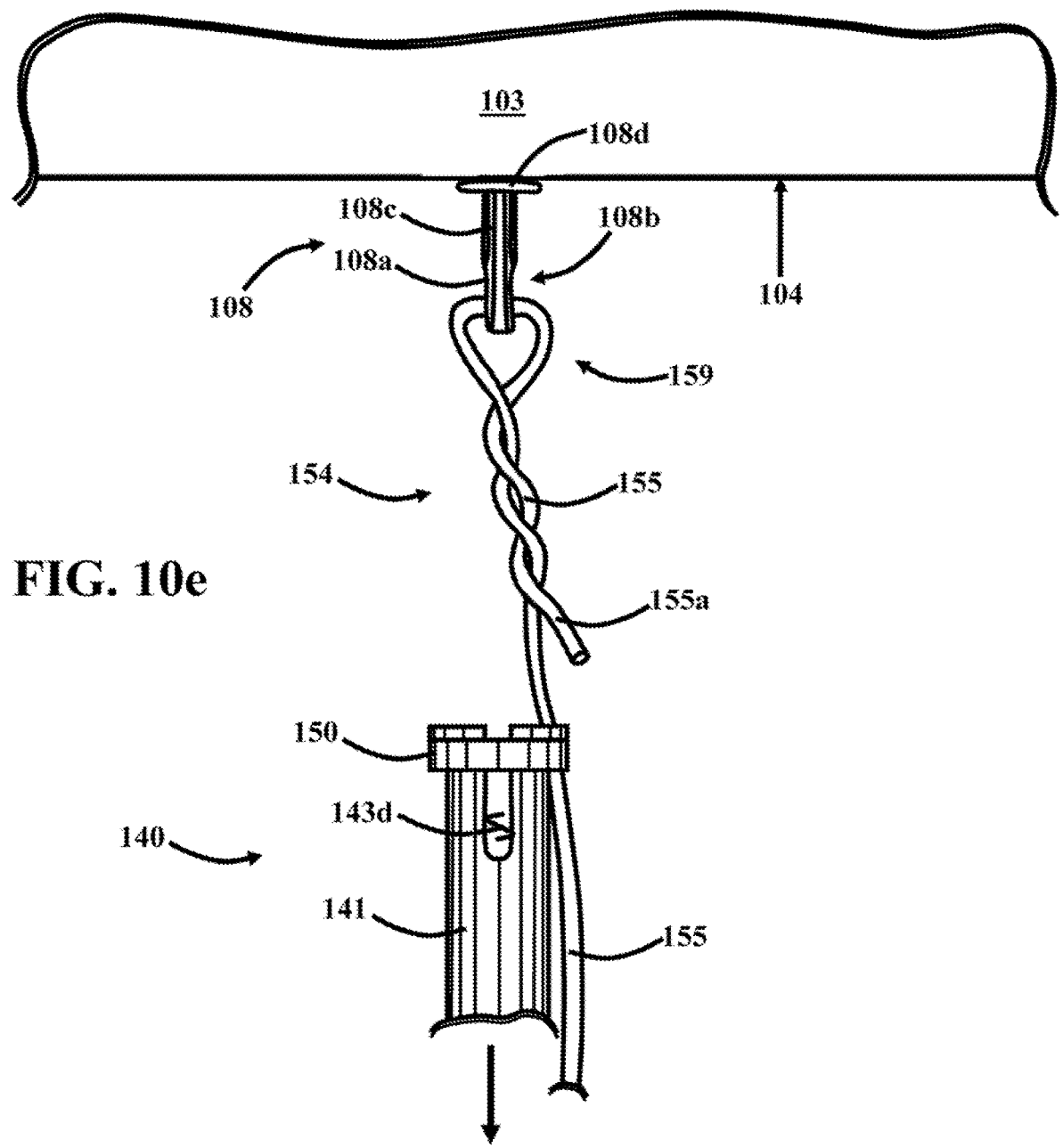
FIG. 10e is a perspective side view of the tool moving away from the twists.
Figure 10F:
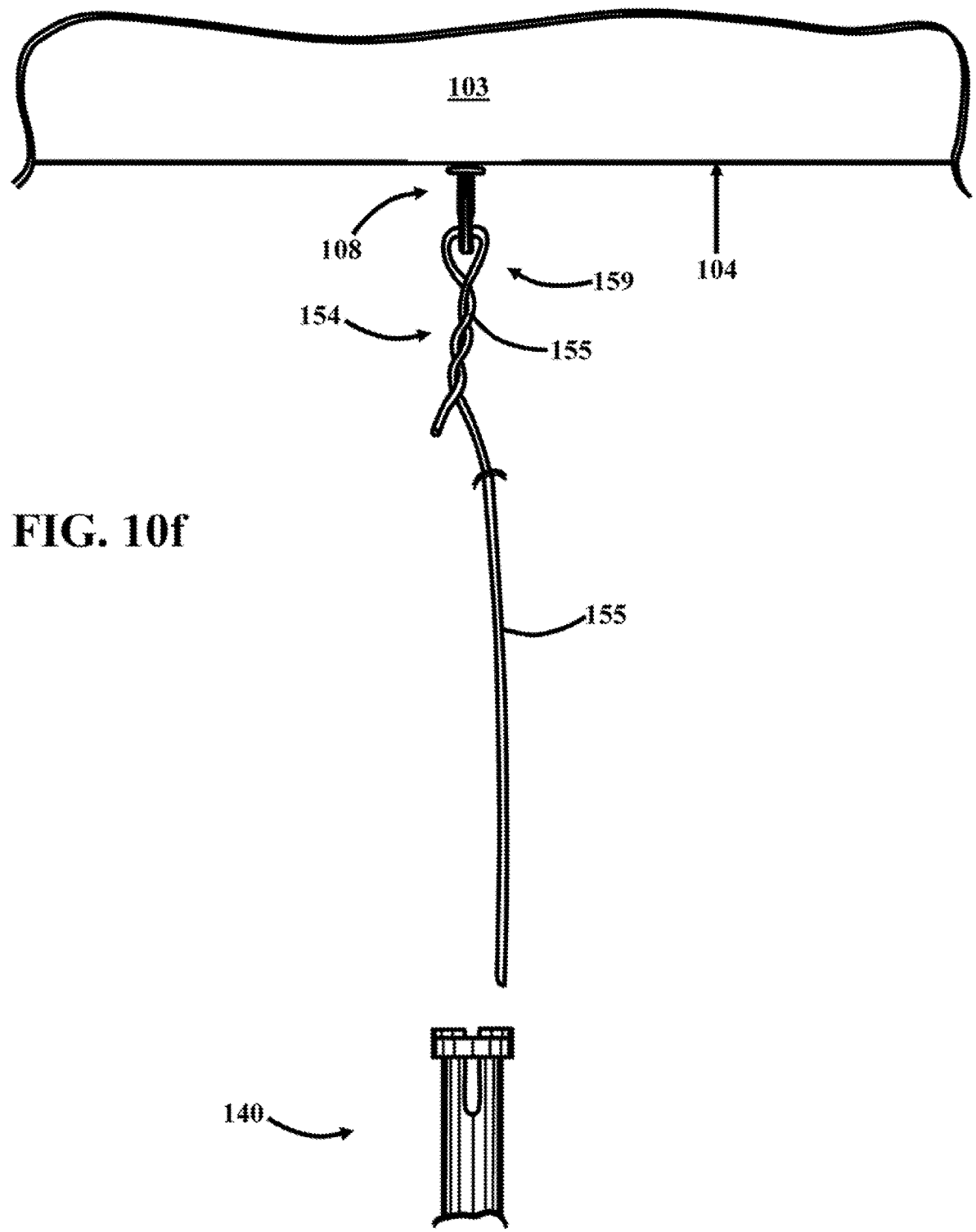
FIG. 10f is a perspective view of the tool moving away from the eye lag screw so the wire is coupled thereto.

FIG. 10e is a perspective side view of the tool 140 moving away from the twists 154. The portion 155a of the wire 155 moves away from the upper cable opening 143c, and the tool 140 is moved so the wire 155 slides through the upper cable opening 143a and lower cable opening 142. Further, the portion 155a of the wire 155 moves away front the upper cable opening 143c, and the tool 140 is moved so the wire 155 slides through the upper cable opening 143a and conduit 110. The tool 140 is moved away from the eye lag screw 108 so the wire 108 is coupled thereto, as shown in FIG. 10f.

Figure 11A:
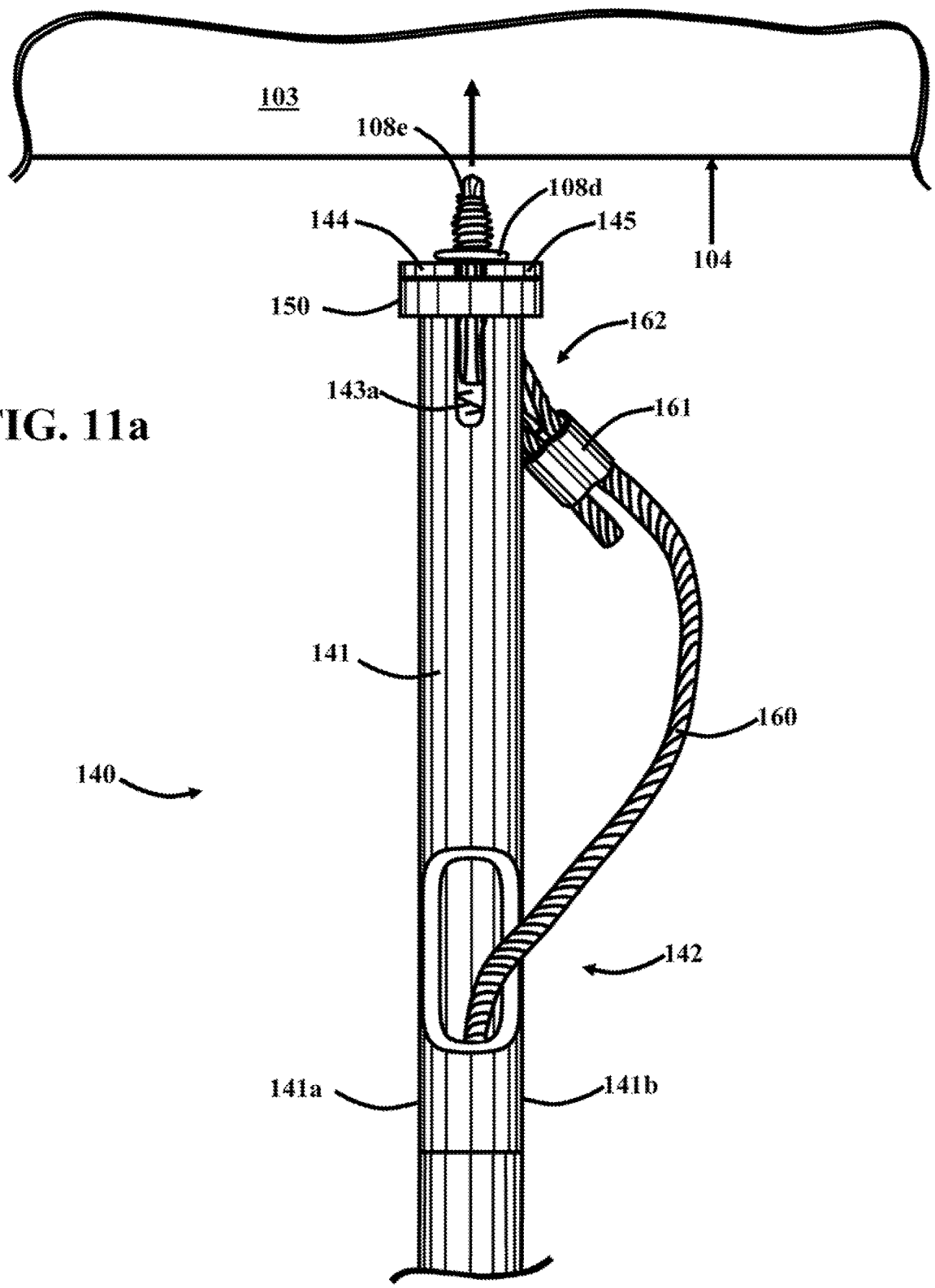
FIGS. 11a and 11b are perspective front views of the tool positioned away from and towards the ceiling (FIG. 1), respectively.
Figure 11B:
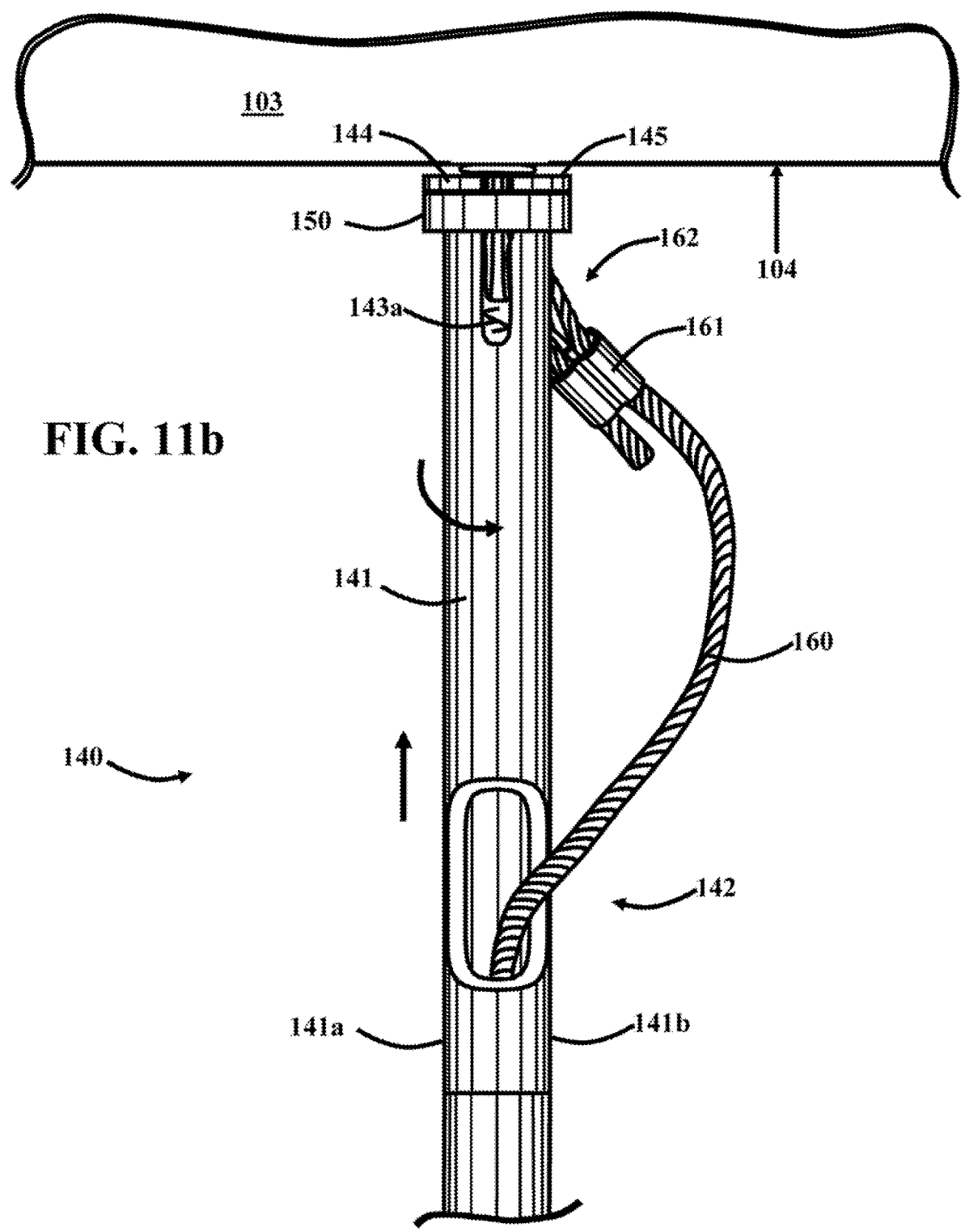

FIGS. 11a and 11b are perspective front views of the tool 140 positioned away from and towards the ceiling 103 (FIG. 1), respectively. It should be noted that the front view corresponds to the side view of FIG. 9b. In this embodiment, the eye lag screw 108 is coupled to a cable 160. The cable 160 can be of many different types. In this embodiment, the cable 160 is referred to as air craft cable. In this embodiment, the cable 160 includes a loop 162, which is held by a clamp 161. The cable 160 is coupled to the eye lag screw 108 by extending the cable 160 through the opening 108b of the head 108a. The clamp 161 holds the loop 162 to the eye lag screw 108.

In this embodiment, the cable 160 is coupled to the tool 140. The cable 160 can be coupled to the tool 140 in many different ways. In this embodiment, the cable 160 is coupled to the tool 140 by positioning the eye lag screw 108 proximate to the ring 150. In particular, the eye lag screw 108 is moved so the head 108a and unthreaded shaft 108c are extended through the space between the flanges 144 and 147 (FIG. 5f). Further, the eye lag screw 108 is moved so the head 108a and unthreaded shaft 108c are extended through the space between the flanges 145 and 146 (FIG. 5f). The eye lag screw 108 is positioned so that the opening 108b faces the upper cable opening 143b (FIG. 5d). Further, the eye lag screw 108 is positioned so that the opening 108b faces the upper cable opening 143d. The loop 162 extends through the upper cable opening 143b. The clamp 161 is positioned proximate to the upper cable opening 143b, and the claim 161 is positioned away from the upper cable opening 143d.

In this embodiment, a distal end of the cable 160 extends through the conduit opening 148 (FIG. 5e). The distal end of the cable 160 is extended through the distal conduit body opening 112b (FIG. 3). The distal end of the cable 160 is extended through the lower cable opening 142 and conduit opening 148. The distal end of the cable 160 is extended through the lower cable opening 142, conduit opening 148, and distal conduit body opening 112b.

In this embodiment, the threaded shaft 108e faces the surface 104. The threaded shaft 108e can be positioned so it faces the surface 104 in many different ways. In this embodiment, the conduit 110 is used to move the tool 140 so that the ring 150 is proximate to the ceiling 103. Further, the conduit 110 is used to move the tool 140 so that the lower cable opening 142 is away from the ceiling 103.

As shown in FIG. 11b, the eye lag screw 108 is moved towards the ceiling 103. In particular, the eye lag screw 108 is moved towards the surface 104. The threaded shaft 108e is driven through the ceiling 103 in response to the rotation of the tool 140. As discussed in more detail above, the tool 140 rotates in response to the rotation of the conduit 110. As shown in FIG. 6, the conduit 110 rotates in response to the rotation of the chuck 130, and the chuck 130 rotates in response to the rotation of the drill chuck 102. Further, the drill chuck 102 rotates in response to the operation of the drill 101. In this way, the eye lag screw 108 is coupled to the ceiling 103. It should be noted that the flange 108d engages the ceiling 103 in response to the eye lag screw 108 being coupled to the ceiling 103.

In this embodiment, the threaded shall 108e is driven through the surface 104 in response to the rotation of the tool 140. As discussed in more detail above, the tool 140 rotates in response to the rotation of the conduit 110. As shown in FIG. 6, the conduit 110 rotates in response to the rotation of the chuck 130, and the chuck 130 rotates in response to the rotation of the drill chuck 102. Further, the drill chuck 102 rotates in response to the operation of the drill 101. In this way, the eye lag screw 108 is coupled to the surface 104. It should be noted that the flange 108d engages the surface 104 in response to the eye lag screw 108 being coupled to the surface 104.

Figure 11C:
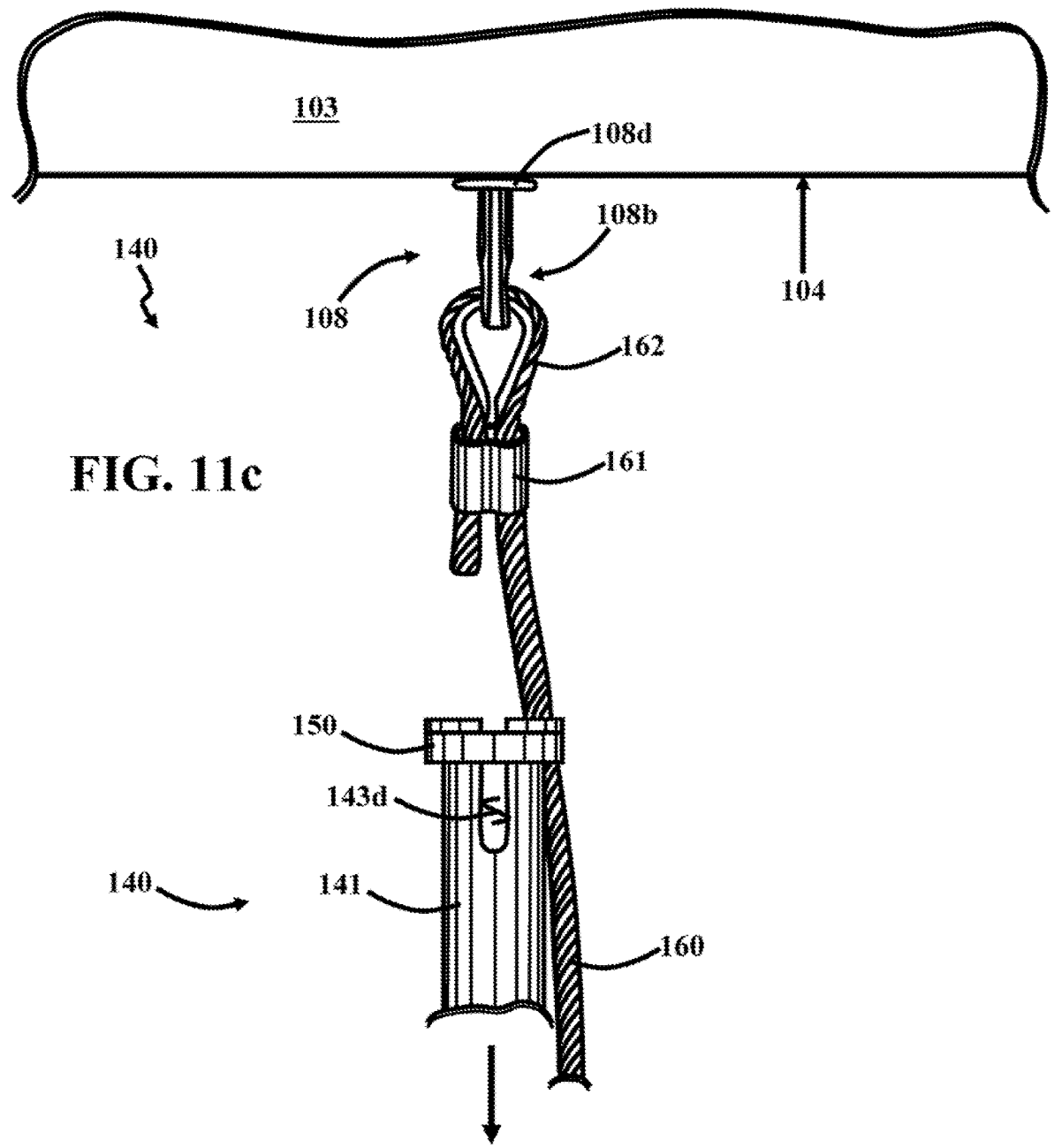
FIG. 11c is a perspective side view of the tool positioned away from the ceiling (FIG. 1), and the eye lag screw coupled to the ceiling.

FIG. 11c is a perspective side view of the tool 140 positioned away from the ceiling 103 (FIG. 1), and the eye lag screw 108 coupled to the ceiling 103. It should be noted that the side view corresponds to the side view of FIG. 9b. In this embodiment, the cable 160 is coupled to the eye lag screw 108, as discussed in more detail above. In particular, the cable 160 extends through the opening 108b of the head 108a. The tool 140 is moved away from the ceiling 103 so the cable 160 slides through the upper cable opening 143b in response. Further, the tool 140 is moved away from the ceiling 103 so the clamp 11 slides through the upper cable opening 143b in response.

Figure 11D:
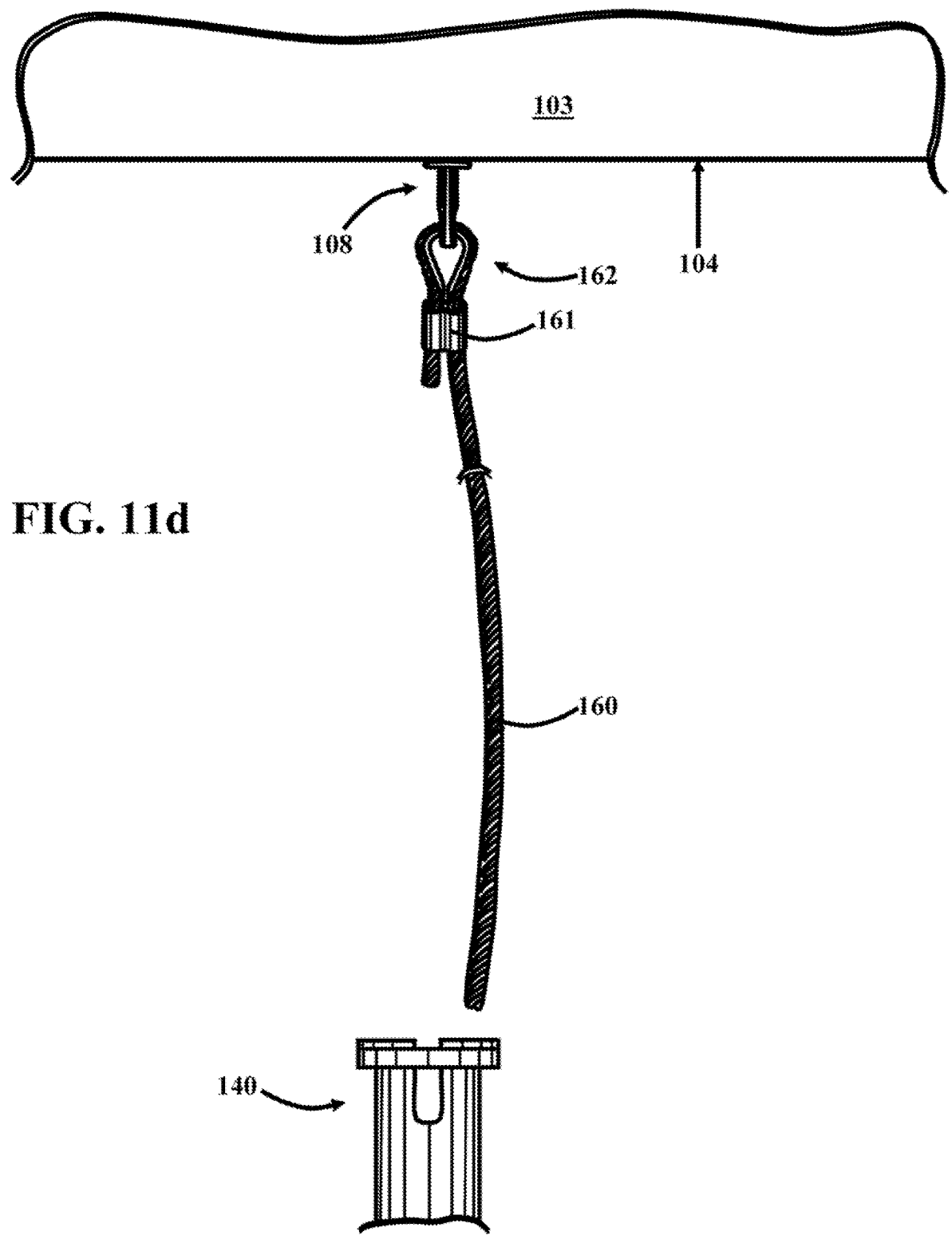
FIG. 11d is a perspective side view of the tool moving away from the ceiling (FIG. 1), and the eye lag screw coupled to the ceiling and the cable coupled to the eye lag screw.

FIG. 11d is a perspective side view of the tool 140 moving away from the ceiling 103 (FIG. 1), and the eye lag screw 108 coupled to the ceiling and the cable 160 coupled to the eye lag screw 108.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A tool, comprising:
   a tool body with first and second flanged portion spaced apart by a first upper cable opening, and a ring positioned proximate thereto;
   wherein the ring includes a ring opening positioned proximate to the first upper cable opening.

2. The tool of claim 1, further including a third flanged portion spaced from the second flanged portion by a second upper cable opening.

3. The tool of claim 1, further including a fourth flanged portion spaced apart from the third flanged portion by a third upper cable opening.

4. The tool of claim 1, wherein the first and fourth flanged portions are spaced apart by a fourth upper cable opening.

5. The tool of claim 1, wherein the ring extends proximate to the second flanged portion.

6. The tool of claim 1, wherein the ring extends proximate to the third flanged portion.

7. The tool of claim 1, wherein the ring extends proximate to the fourth flanged portion.

8. The tool of claim 1, wherein the tool body includes a lower cable opening positioned away from the ring.

9. The tool of claim 1, wherein the tool body includes a conduit opening positioned away from the ring.

10. A tool, comprising:
    a tool body which includes a conduit opening extending therethrough, first and second flanged portion spaced apart by a first upper cable opening, and a ring positioned proximate thereto;
    wherein the ring includes a ring opening positioned proximate to the first upper cable opening.

11. The tool of claim 10, wherein the tool body includes a lower cable opening positioned away from the ring.

12. The tool of claim 11, further including a wire extending through the conduit opening and a lower cable opening.

13. The tool of claim 12, further including an eye screw whit extends through the first upper cable opening and ring opening.

14. The tool of claim 13, wherein the wire extends through an opening of the eye lag screw.

15. A tool, comprising:
- a tool body which includes a conduit opening extending therethrough, and a lower cable opening;
- first and second flanged portion spaced apart by a first upper cable opening;
- a ring positioned proximate to the first and second flanged portion, wherein the ring includes a ring opening positioned proximate to the first upper cable opening; and
- a wire extending through the conduit opening and a lower cable opening.

16. The tool of claim 15, further including an eye lag screw which extends through the first upper cable opening and ring opening.

17. The tool of claim 16, wherein the wire extends through an opening of the eye lag screw.

18. The tool of claim 17, further including a second upper cable opening, wherein the wire extends through the first and second upper cable openings.

19. The tool of claim 18, wherein the wire is twisted in response to rotating the tool body.

20. The tool of claim 19, wherein the wire extends through the ring in response to moving the eye lag screw from the tool body.

* * * * *